(12) United States Patent
Oskin et al.

(10) Patent No.: US 7,657,882 B2
(45) Date of Patent: Feb. 2, 2010

(54) WAVESCALAR ARCHITECTURE HAVING A WAVE ORDER MEMORY

(75) Inventors: Mark H. Oskin, Seattle, WA (US); Steven J. Swanson, Seattle, WA (US); Susan J. Eggers, Seattle, WA (US)

(73) Assignee: University of Washington, Seattle, WA (US)

( * ) Notice: Subject to any disclaimer, the term of this patent is extended or adjusted under 35 U.S.C. 154(b) by 557 days.

(21) Appl. No.: 11/041,396

(22) Filed: Jan. 21, 2005

(65) Prior Publication Data

US 2005/0166205 A1 Jul. 28, 2005

Related U.S. Application Data

(60) Provisional application No. 60/630,765, filed on Nov. 24, 2004, provisional application No. 60/538,603, filed on Jan. 22, 2004.

(51) Int. Cl.
*G06F 9/45* (2006.01)
(52) U.S. Cl. ............... 717/156; 717/149; 717/155; 717/161; 712/25; 712/201
(58) Field of Classification Search ......... 717/150–159, 717/161; 712/206, 208, 220, 242; 718/102
See application file for complete search history.

(56) References Cited

U.S. PATENT DOCUMENTS

| | | | | |
|---|---|---|---|---|
| 4,814,978 A | * | 3/1989 | Dennis | 712/201 |
| 4,873,626 A | * | 10/1989 | Gifford | 710/120 |
| 5,226,131 A | * | 7/1993 | Grafe et al. | 712/201 |
| 5,253,308 A | * | 10/1993 | Johnson | 382/304 |
| 5,745,725 A | * | 4/1998 | Simpson | 712/214 |
| 5,913,925 A | * | 6/1999 | Kahle et al. | 712/206 |
| 5,961,639 A | * | 10/1999 | Mallick et al. | 712/242 |
| 6,182,210 B1 | | 1/2001 | Akkary et al. | 712/235 |
| 6,212,542 B1 | * | 4/2001 | Kahle et al. | 718/102 |
| 6,223,338 B1 | | 4/2001 | Smolders | 717/128 |
| 6,286,095 B1 | | 9/2001 | Morris et al. | 712/216 |
| 6,327,607 B1 | | 12/2001 | Fant | 709/201 |
| 6,470,443 B1 | | 10/2002 | Emer et al. | 712/205 |
| 6,530,079 B1 | | 3/2003 | Choi et al. | 717/158 |
| 6,606,702 B1 | | 8/2003 | Guthrie et al. | 712/218 |
| 6,708,269 B1 | | 3/2004 | Tiruvallur et al. | 712/225 |
| 6,735,760 B1 | | 5/2004 | Dice | 717/139 |
| 6,986,131 B2 | * | 1/2006 | Thompson et al. | 717/160 |
| 6,988,183 B1 | * | 1/2006 | Wong | 712/208 |
| 2003/0126186 A1 | | 7/2003 | Rodgers et al. | 709/107 |

OTHER PUBLICATIONS

Modern Processor Design Fundamentals of Superscalar Processors, John Paul Shen et al, BETA Edition, Oct. 9, 2002, Whole Manual.*

(Continued)

*Primary Examiner*—Lewis A Bullock, Jr.
*Assistant Examiner*—Jue Wang
(74) *Attorney, Agent, or Firm*—Ronald M. Anderson

(57) ABSTRACT

A dataflow instruction set architecture and execution model, referred to as WaveScalar, which is designed for scalable, low-complexity/high-performance processors, while efficiently providing traditional memory semantics through a mechanism called wave-ordered memory. Wave-ordered memory enables "real-world" programs, written in any language, to be run on the WaveScalar architecture, as well as any out-of-order execution unit. Because it is software-controlled, wave-ordered memory can be disabled to obtain greater parallelism. Wavescalar also includes a software-controlled tag management system.

30 Claims, 10 Drawing Sheets

OTHER PUBLICATIONS

Swanson et al. "WaveScalar", Dec. 2003, Proceedings of the 36$^{th}$ International Symposium on Microarchitecture.*

Swanson et al. "WaveScalar", Jan. 2003, Technical Report, Department of Computer Science and Engineering, University of Washington.*

Arvind et al. "Executing a Program on the MIT Tagged-Token Dataflow Architecture", Mar. 1990, IEEE Transactions on Computers, vol. 39, No. 3, pp. 300-318.*

Papadopoulos et al. "Monsoon: an Explicit Token-Store Architecture", Jun. 1990, ACM SIGARCH Computer Architecture News, vol. 18, Issue 3a, pp. 82-91.*

Sato et al. "Thread-Based Programming for the EM-4 Hybrid Dataflow Machine" 1992, Proceedings of the 19th Annual International Symposium on Computer Architecture, pp. 146-155.*

Lee et al. "Program Partitioning for Multithreaded Dataflow Computers", 1993, Proceedings of the 26$^{th}$ Hawaii International Conference on System Sciences, pp. 487-495.*

T. M. Austin. DIVA: A Reliable Substrate for Deep Submicron Microarchitecture Design, In *Proceedings of the 32$^{nd}$ International Symposium on Microarchitecture*, Nov. 1999. 12pp.

K. Mai, et al., "Smart Memories: A Modular Reconfigurable Architecture." *International Symposium on Computer Architecture*, 2002. 11 pp.

R. Nagarajan et al. "A Design Space Evaluation of Grid Processor Architectures." *International Symposium on Microarchitecture*, 2001. pp. 1-12.

E. Rotenberg. "AR-SMT: A Microarchitectural Approach to Fault Tolerance in Microprocessors." Computer Sciences Department, University of Wisconsin-Madison. (ericro@cs.wisc.edu). 8pp.

E. Waingold, et al. "Baring It All to Software: Raw Machines." *IEEE Computer*. Sep. 1997. pp. 86-93.

Fang et al. "Automatic fence insertion for shared memory multiprocessing" ICS '03; 2003.

Fu et al. "Value Speculation Scheduling for High Performance Processors" Department of Electrical and Computer Engineering, North Carolina State University. 1998.

Gallagher et al. "Dynamic Memory Disambiguation Using the Memory Conflict Buffer" 1994; ASPLOS-VI.

Black et al.; "The Block-based Trace Cache"; 1999; IEEE Computer Society; International Symposium on Computer Architecture '99; pp. 196-207.

Connors et al.; "Compiler-Directed Dynamic Computation Reuse: Rationale and Initial Results"; 1999; IEEE Computer Society; International Symposium on Microarchitecture '99; pp. 158-169.

Gharachorloo et al.; Memory Consistency and Event Ordering in Scalable Shared-Memory Multiprocessors; 1990; ACM Press; International Symposium on Computer Architecture '90; pp. 15-26.

Shen et al.; "Modern Processor Design: Fundamentals of Superscalar Processors"; Jul. 2002; McGraw-Hill; Beta Edition; pp. 442, 446-447, 450.

* cited by examiner

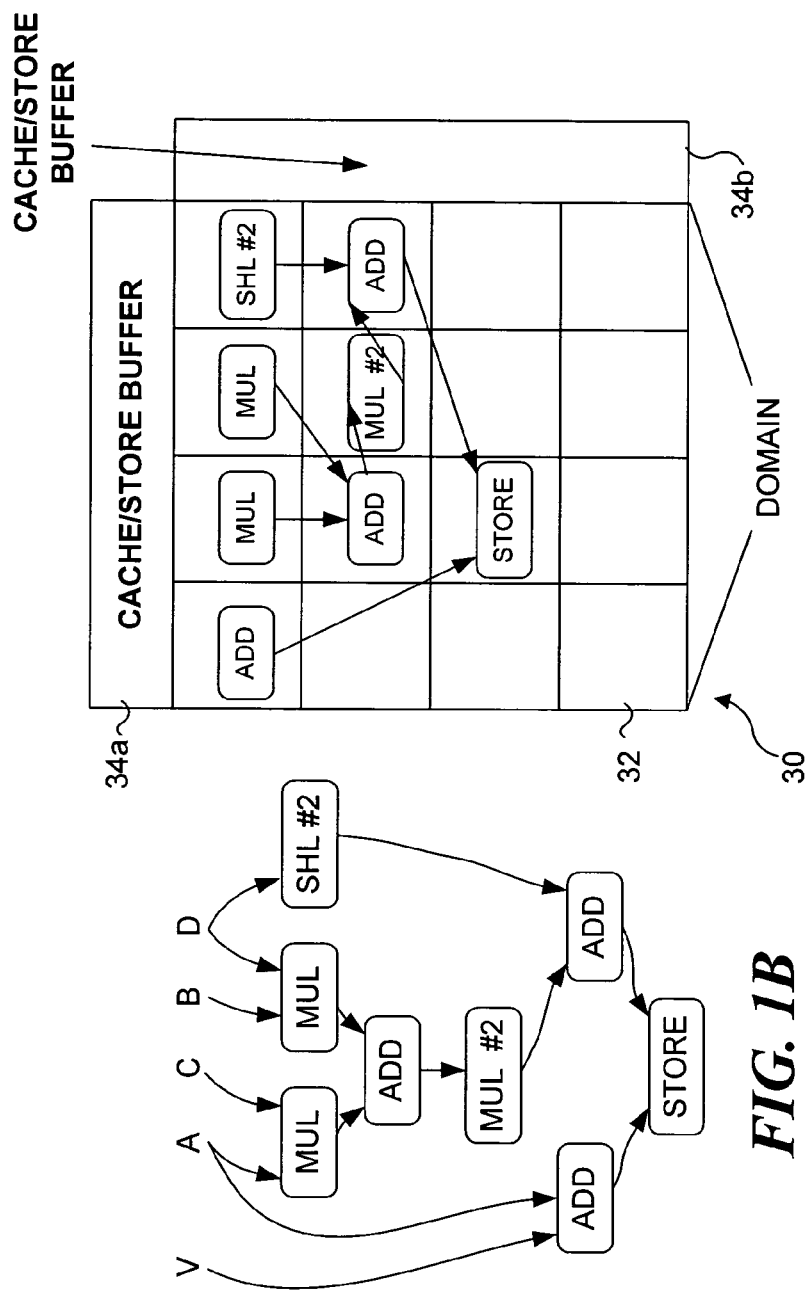

WAVESCALAR ARCHITECTURE HAVING A WAVE ORDER MEMORY

RELATED APPLICATIONS

This application is based on a prior provisional application, Ser. No. 60/538,603, filed on Jan. 22, 2004, and on a prior provisional application, Ser. No. 60/630,765, filed on Nov. 24, 2004, the benefit of the filing dates of which is hereby claimed under 35 U.S.C. §119(e).

GOVERNMENT RIGHTS

This invention was made with U.S. Government support under grants ACI-0133188, CCF-0133188, and CCF-0325635 awarded by the National Science Foundation. The U.S. Government has certain rights in the invention.

FIELD OF THE INVENTION

The present invention generally pertains to a dataflow instruction set architecture (ISA) and execution model, and more specifically, to a dataflow ISA that includes many processors, each using a wave-ordered memory for executing instructions in waves, where the instructions are stored in distributed processor caches to minimize data transfer time.

BACKGROUND OF THE INVENTION

It is widely accepted that Moore's Law growth in available transistors will continue for the next decade. Recent research, however, has demonstrated that simply scaling up current architectures will not convert these new transistors to commensurate increases in performance. This gap between the performance improvements that are needed and those that can be realized by simply constructing larger versions of existing architectures will fundamentally alter processor designs.

Three problems contribute to this gap, creating a processor scaling wall. The problems include the ever-increasing disparity between computation and communication performance—fast transistors, but slow wires; the increasing cost of circuit complexity, leading to longer design times, schedule slips, and more processor bugs; and the decreasing reliability of circuit technology, caused by shrinking feature sizes and continued scaling of the underlying material characteristics. In particular, modern superscalar processor designs will not scale, because they are built atop a vast infrastructure of slow broadcast networks, associative searches, complex control logic, and inherently centralized structures that must all be designed correctly for reliable execution. Like the memory wall, the processor scaling wall has motivated a number of research efforts. These efforts all augment the existing program counter-driven von Neumann model of computation by providing redundant checking mechanisms (see for example, the work by T. M. Austin, "DIVA: A reliable substrate for deep submicron microarchitecture design," *International Symposium on Microarchitecture*, 1999); exploiting compiler technology for limited dataflow-like execution, as disclosed by R. Nagarajan et al., "A design space evaluation of grid processor architectures," *International Symposium on Microarchitecture*, 2001; or efficiently exploiting coarse grained parallelism, as proposed by K. Mai et al., "Smart memories: A modular reconfigurable architecture," *International Symposium on Computer Architecture*, 2002, or as disclosed by E. Waingold et al., "Baring it all to software: Raw machines," *IEEE Computer*, vol. 30, no. 9, 1997.

A Case for Exploring Superscalar Alternatives

The von Neumann model of execution and its most sophisticated implementations, out-of-order superscalars, have been a phenomenal success. However, superscalars suffer from several drawbacks that are beginning to emerge. First, their inherent complexity makes efficient implementation a daunting challenge. Second, they ignore an important source of locality in instruction streams; and third, their execution model centers around instruction fetch, an intrinsic serialization point.

As features and cycle times shrink, the hardware structures that form the core of superscalar processors (register files, issue windows, and scheduling logic) become extremely expensive to access. Consequently, clock speed decreases and/or pipeline depth increases. Indeed, industry recognizes that building ever-larger superscalars as transistor budgets expand can be impractical, because of the processor scaling wall. Many manufacturers are tuning to larger caches and chip multiprocessors to convert additional transistors into increased performance without impacting cycle time.

To squeeze maximum performance from each core, architects constantly add new algorithms and structures to designs. Each new mechanism, optimization, or predictor adds additional complexity and makes verification time an ever increasing cost in processor design. Verification already consumes about 40% of project resources on complex designs, and verification costs are increasing.

Untapped Locality

Superscalars devote a large share of their hardware and complexity to exploiting locality and predictability in program behavior. However, they fail to utilize a significant source of locality intrinsic to applications, i.e., dataflow locality. Dataflow locality is the predictability of instruction dependencies through the dynamic trace of an application. A processor could take advantage of this predictability to reduce the complexity of its communication system (i.e., register files and bypass networks) and reduce communication costs.

Dataflow locality exists, because data communication patterns among static instructions are predictable. There are two independent, but complimentary, types of dataflow locality—static and dynamic. Static dataflow locality exists, because, in the absence of control, the producers and consumers of register values are precisely known. Within a basic block and between basic blocks that are not control dependent (e.g., the basic blocks before and after an If-Then-Else) the data communication patterns are completely static and, therefore, completely predictable. Dynamic dataflow locality arises from branch predictability. If a branch is highly predictable and almost always taken, for instance, then the static instructions before the branch frequently communicate with instructions on the taken path and rarely communicate with instructions on the not-taken path.

The vast majority of operand communication is highly predictable. Such high rates of predictability suggest that current processor communication systems are over-general, because they provide instructions with fast access to many more register values than needed. If the processor could exploit dataflow locality to ensure that necessary inputs were usually close at hand (at the expense of other potential inputs being farther away), they could reduce the average cost of communication.

Instead of simply ignoring dataflow locality, however, superscalars destroy it in their search for parallelism. Register renaming removes false dependencies, enables dynamic loop unrolling, and exposes a large amount of dynamic instruction level parallelism (ILP) for the superscalar core to exploit.

However, it destroys dataflow locality. By changing the physical registers and instruction uses, renaming forces the architecture to provide each instruction with fast access to the entire physical register file, which results in a huge, slow register file and complicated forwarding networks.

Destroying dataflow locality leads to a shocking inefficiency in modern processor designs: The processor fetches a stream of instructions with a highly predictable communication pattern, destroys that predictability by renaming, and then compensates by using broadcast communication in the register file and the bypass network, combined with complex scheduling in the instruction queue. The consequence is that modern processor designs devote few resources to actual execution (less than 10%, as measured on a Pentium III die photo) and the vast majority to communication infrastructure. This infrastructure is necessary precisely because superscalars do not exploit dataflow locality.

Several industrial designs, such as partitioned superscalars like the Alpha 21264, some very long instruction word (VLIW) machines and several research designs have addressed this problem with clustering or other techniques and exploit dataflow locality to a limited degree. But none of these approaches make full use of it, because they still include large forwarding networks and register files. Accordingly, it would be desirable to provide an execution model and architecture built expressly to exploit the temporal, spatial, and dataflow locality that exists in instruction and data streams.

The von Neumann Model: Serial Computing

The von Neumann model of computation is very simple. It has three key components: a program stored in memory, a global memory for data storage, and a program counter that guides execution through the stored program. At each step, the processor loads the instruction at the program counter, executes it (possibly updating main memory), and updates the program counter to point to the next instruction (possibly subject to branch instructions).

Two serialization points constrain the von Neumann model and, therefore, superscalar processors. The first arises as the processor, guided by the program counter and control instructions, assembles a linear sequence of operations for execution. The second serialization point is at the memory interface where memory operations must complete (or appear to complete) in order to guarantee load-store ordering. The elegance and simplicity of the model are striking, but the price is steep. Instruction fetch introduces a control dependence between each instruction and the next and serves little purpose besides providing the ordering to which the memory interface must adhere. As a result, von Neumann processors are fundamentally sequential; there is no parallelism in the von Neumann processor model.

In practice, of course, von Neumann processors do achieve limited parallelism (i.e., instructions per cycle (IPCs) greater than one), by using several methods. The explicitly parallel instructions sets for VLIW and vector machines enable the compiler to express instruction and data independence statically. Superscalars dynamically examine many instructions in the execution stream simultaneously, violating the sequential ordering when they determine it is safe to do so. In addition, recent work introduces limited amounts of parallelism into the fetch stage by providing multiple fetch and decode units.

It has been demonstrated that ample ILP exists within applications, but that the control dependencies that sequential fetch introduces constrain this ILP. Despite tremendous effort over decades of computer architecture research, no processor comes close to exploiting the maximum ILP present in applications, as measured in limit studies. Several factors account for this result, including the memory wall and necessarily finite execution resources, but control dependence and, by extension, the inherently sequential nature of von Neumann execution, remain dominant factors. Accordingly, a new approach is needed to overcome the limitations of the von Neumann model.

SUMMARY OF THE INVENTION

The present invention is an alternative to superscalar architecture and is referred to herein by the term "WaveScalar." Unlike past dataflow work, which focused on maximizing processor utilization, WaveScalar seeks to minimize communication costs by avoiding long wires and broadcast networks. To this end, it includes a completely decentralized implementation of the "token-store" of traditional dataflow architectures and a distributed execution model.

The key difference between WaveScalar and prior art dataflow architectures is that WaveScalar efficiently supports traditional von Neumann-style memory semantics in a dataflow model. Previously, dataflow architectures provided their own style of memory semantics and their own dataflow languages that disallowed side effects, mutable data structures, and many other useful programming constructs. Indeed, a memory ordering scheme that enables a dataflow machine to efficiently execute code written in general purpose, imperative languages (such as C, C++, Fortran, or Java) has eluded researchers for several decades. In contrast, the present invention provides a memory ordering scheme that efficiently executes programs written in any language, as described below.

Solving the memory ordering problem without resorting to a von Neumann-like execution model enables a completely decentralized dataflow processor to be built that eliminates all the large hardware structures that make superscalars nonscalable. Other recent attempts to build scalable processors, such as TRIPS (R. Nagarajan et al., "A design space evaluation of grid processor architectures," *International Symposium on Microarchitecture,* 2001, and K. Sankaralingam et al., "Exploiting ILP, TLP, and DLP with the polymorphous trips architecture," in *International Symposium on Computer Architecture,* 2003) and Raw (W. Lee et al., "Space-time scheduling of instruction-level parallelism on a Raw machine," *International Conference on Architectural Support for Programming Languages and Operating Systems,* 1998), have extended the von Neumann paradigm in novel ways, but they still rely on a program counter to sequence program execution and memory access, limiting the amount of parallelism they can reveal. WaveScalar completely abandons the program counter and linear von Neumann execution.

WaveScalar is currently implemented on a substrate comprising a plurality of processing nodes that effectively replaces the central processor and instruction cache of a conventional system. Conceptually, WaveScalar instructions execute in-place in the memory system and explicitly send their results to their dependents. In practice, WaveScalar instructions are cached in the processing elements—hence the name "WaveCache."

The WaveCache loads instructions from memory and assigns them to processing elements for execution. They remain in the cache over many, potentially millions, of invocations. Remaining in the cache for long periods of time enables dynamic optimization of an instruction's physical placement in relation to its dependents. Optimizing instruction placement also enables a WaveCache to take advantage of predictability in the dynamic data dependencies of a program, which is referred to herein as "dataflow locality." Just like conventional forms of locality (temporal and spatial), dataflow locality can be exploited by cache-like hardware structures. The following disclosure provides further details of the WaveScalar ISA and an exemplary WaveCache architecture.

One aspect of the present invention is directed to a method for efficiently executing an application program using a plurality of processing elements that can execute instructions comprising the application program. A preferred embodiment of the invention includes the step of dividing a control flow graph of the application program into a plurality of waves, each of which is associated with a wave number. Each wave comprises a connected, directed acyclic portion of the control flow graph, with a single entrance. Wave number tags to be used in identifying each individual instance of data used when executing the application program are provided. Also, wave management instructions are added to the instructions comprising the application program to manage the wave number tags and the wave numbers associated with the waves, in accordance with a predefined instruction set architecture. Within each wave, each memory operation is annotated with its location in the wave and its ordering relationship with other memory operations in the wave, to define a wave-ordered memory. The plurality of waves are then executed with the plurality of processing elements, using the wave number tags, wave management instructions, and annotations of the memory operations to control the execution of the instructions comprising the application program, so that the execution of the instructions occurs in a desired order within each wave.

Within each wave, the step of annotating each memory operation preferably comprises the step of statically assigning a unique sequence number within the wave to each memory operation. Thus, the step of annotating each memory operation further comprises the step of labeling each memory operation with sequence numbers of its predecessor and successor memory operations, where possible, forming a link between the memory operation and its predecessor and successor memory operations. All of these links thereby carry out the step of encoding a structure of the control flow graph for the wave to enforce a correct order of the memory operations. The step of encoding the structure preferably includes the step of determining that a gap does not exist in a sequence of memory operations, i.e., that for each given memory operation, the sequence number of its successor memory operation matches the sequence number of a next memory operation; or its successor memory operation is undetermined and the sequence number for the predecessor memory operation of a next memory operation matches the sequence number of the given memory operation; or its predecessor memory operation is undetermined and the sequence number for the successor memory operation of a previous memory operation matches the sequence number of the given memory operation. A placeholder memory instruction is added to a path between a control flow branch and a merge that includes no memory operation before repeating the above sequence number check.

The links encoding the structure of the control flow graph define sequencing information for executing the application program that provides a summary of possible paths taken while executing the application program. The sequencing information is used for at least one of defining the correct order of the memory operations, detecting misspeculations in a speculative memory system associated with executing the application program, and determining that memory operations are not aliased.

Optionally, the wave-ordered memory can be disabled to increase an extent of parallelism applied when executing the application program.

As a further application of the present invention, the wave-ordered memory can be used for order memory operations on a von Neumann processor.

If the application program includes a loop that requires carrying out one or more iterations, the method preferably also includes the step of employing wave advance instructions to compute a wave number for each iteration; the wave number for each iteration is different than the wave number for any other iteration. The wave advance instructions enable management of wave numbers to be entirely distributed and under software control.

In one preferred embodiment, the plurality of processing elements are grouped hierarchically into a plurality of domains, and the domains are grouped into a plurality of clusters. Alternatively, the processing element can simply be grouped into at least one cluster.

Another step of the method provides for storing the memory instructions at least temporarily in at least one of a memory cache and a store buffer.

Because there are a plurality of processing elements, optionally, the method can include the step of detecting any defective processing element. Instructions and data can then be routed around a defective processing element.

The processing element preferably includes a component that matches operand tags and holds operands for an instruction until all operands required for executing the instruction have been received by the processing element.

Another aspect of the present invention is directed to a processing system for efficiently executing an application program. The processing system includes a plurality of processing elements organized into either a cluster, or a domain. Each of the plurality of processing elements includes an arithmetic logic unit, and a component that holds operands used by an instruction until all operands necessary to execute the instruction have been received. The instruction and the operands that were held then are executed by the arithmetic logic unit. Also included is a store buffer used for controlling a sequence in which instructions comprising the application program are executed by the plurality of processing elements, so as to ensure that the instructions are executed in a correct order, the order being controlled in response to annotations applied to the memory operations. Other aspects of the processing system are generally consistent with the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 1A, 1B, and 1C illustrate three views of code in WaveScalar, including the C code for a simple computation in FIG. 1A, a WaveScalar dataflow graph in FIG. 1B, and the same graph mapped onto a 16 PE domain in the WaveCache substrate in FIG. 1C;

FIGS. 5A and 5B are graphs showing speedup vs. baseline WaveCache performance for several different matching queue size, wherein for FIG. 5A, the performance of the workloads are grouped and averaged by type, while FIG. 5B shows the performance all the applications individually;

Figure 6:
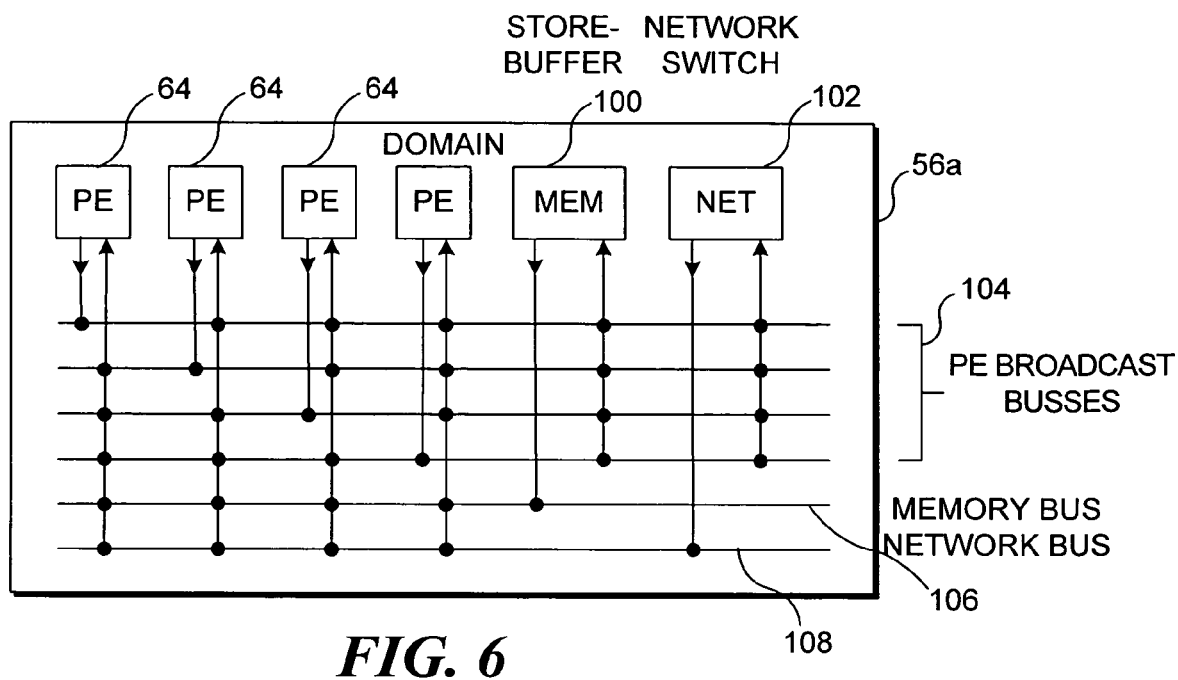
Figure 7:
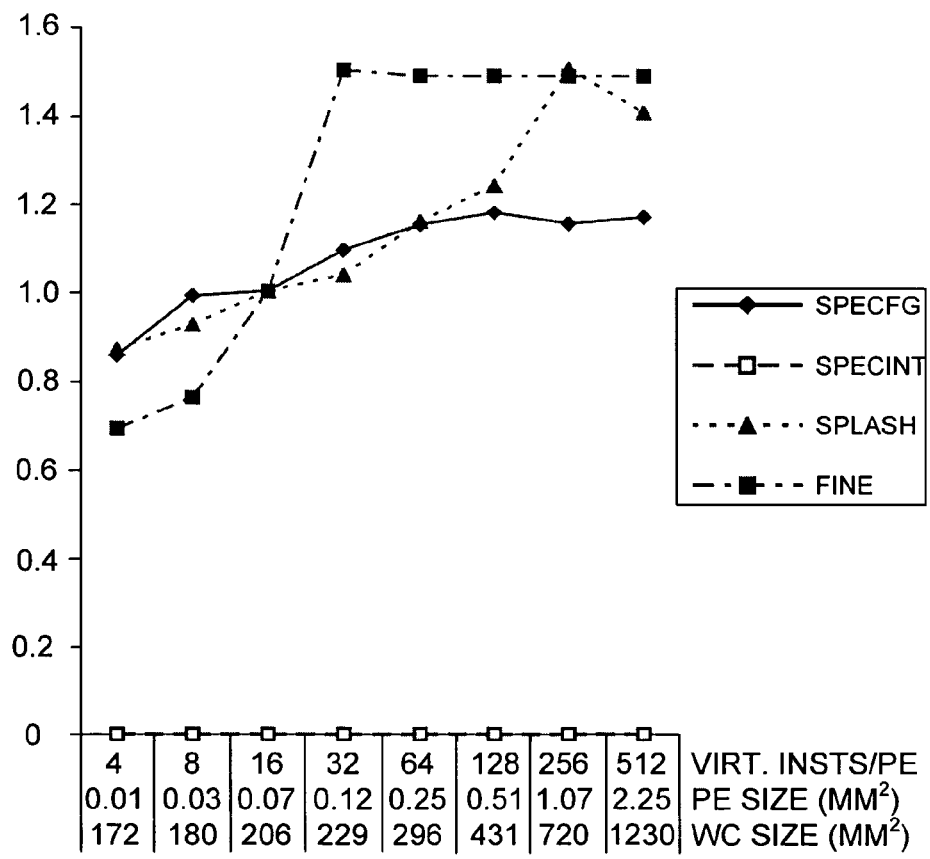
Figures 8, 9:
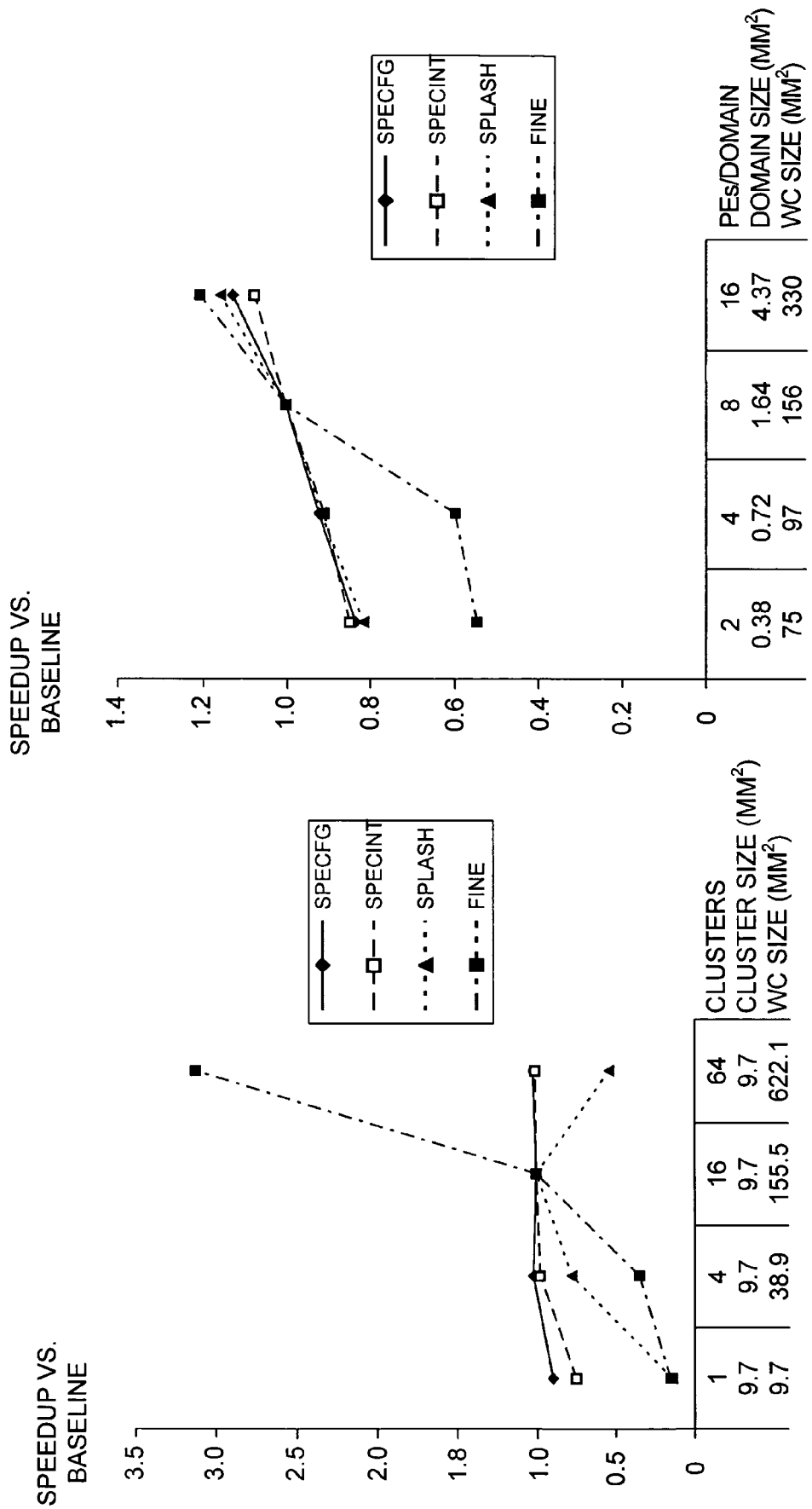
Figure 10:
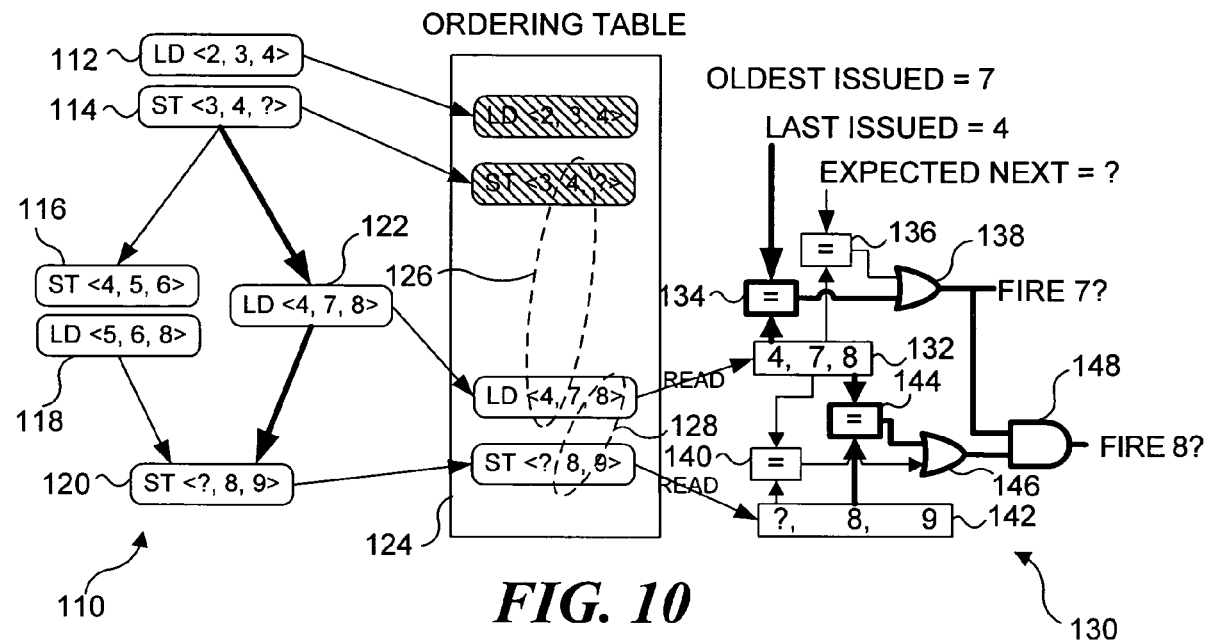
Figure 11:
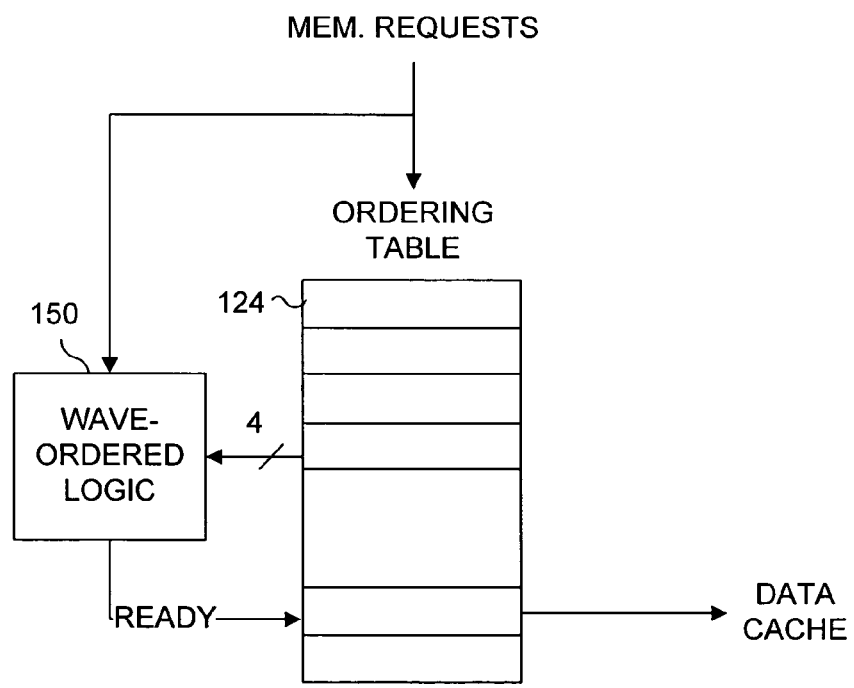
Figure 12:
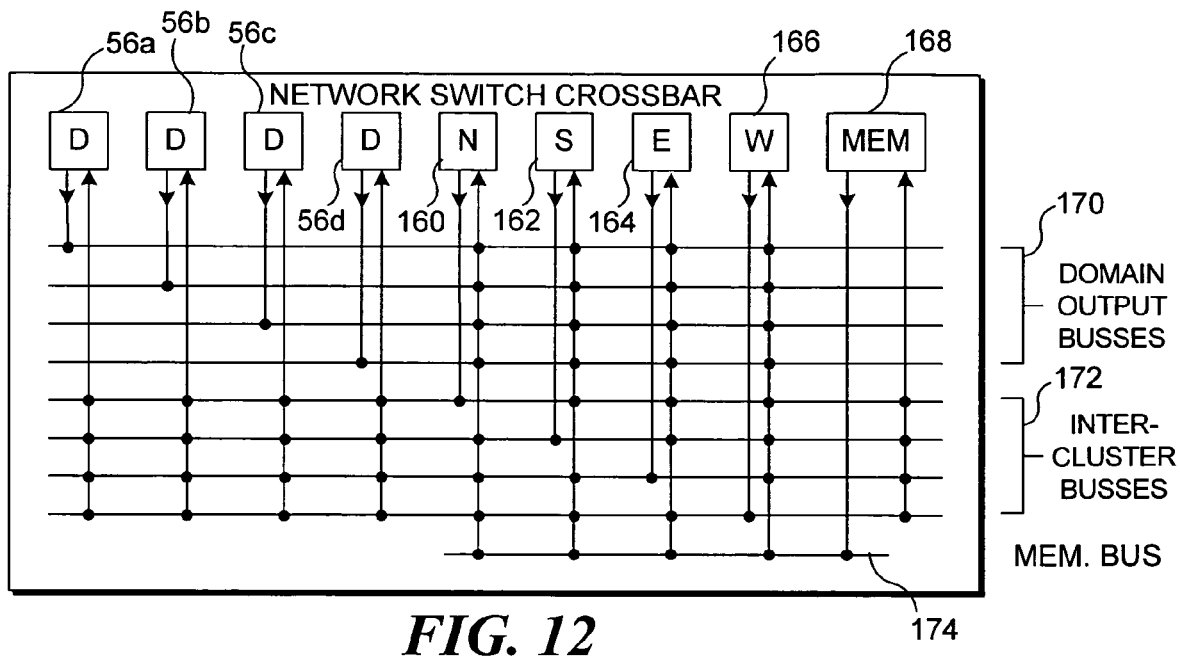
Figure 13:
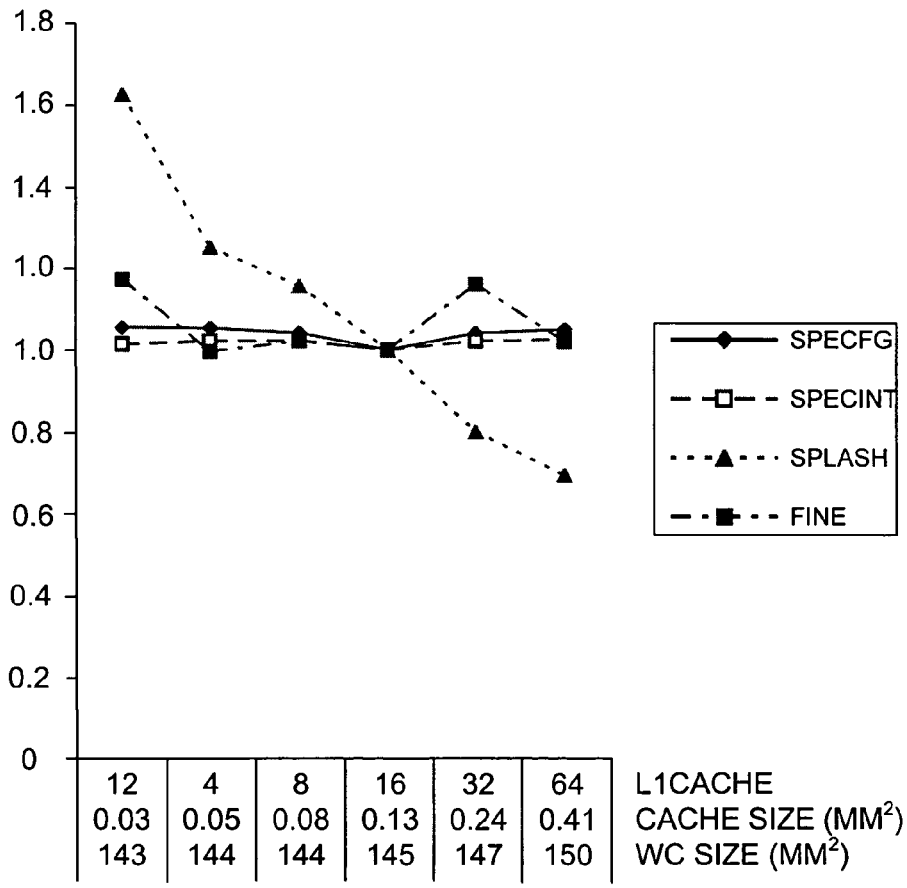

FIG. 6 is an exemplary schematic diagram of the intra-domain interconnect for a 4-PE domain, wherein each horizontal line is a broadcast bus, one for each PE and the network and memory interfaces, the black dots represent connections between busses, and communication paths through the interconnect move down to a broadcast bus, across, and then up to their destination; each PE listens on all the busses except its own output bus (the PEs can forward values to themselves internally), and the memory and network interfaces do not need to listen to each other;

FIG. 7 (in regard to virtualization), showing the performance effect of increasing the number instructions that each processing element can hold;

FIG. 8 is a graph of speedup vs. baseline (in regard to WaveCache size), showing that increasing the size of the WaveCache can improve performance, although in some cases, the increased communication costs of a larger grid out-weigh the benefits;

FIG. 9 is a graph of speedup vs. baseline (in regard to Domain size) showing that adding PEs to the domains increases performance by reducing the number of inter-domain messages that must be sent;

FIG. 10 is a schematic diagram for implementing wave-ordered memory, illustrating a simple wave's control flow graph on the left side of the diagram, which shows the memory operations in each basic block, their ordering annotations, and how the annotations allow the ordering table and logic to reconstruct the correct order, and wherein the darker arrows in the graph show the executed path, while in the center of the diagram, an ordering table for the block at left is illustrated after execution of memory operations 3 and 4, only, and on the right side of the diagram, logic controlling execution of memory operations in this example is shown;

FIG. 11 is a schematic diagram of an exemplary Wave-Cache store buffer, showing the hardware needed to implement wave-ordered memory for one wave;

FIG. 12 is a schematic diagram (following the same convention as in FIG. 6) of an exemplary network switch interconnect having nine input/output ports, including one for each of the four domains, each cardinal direction, and one for the store buffer; and FIG. 13 is a graph of speedup vs. baseline (in regard to L1 data cache size).

DESCRIPTION OF THE PREFERRED EMBODIMENT

WaveScalar, a recently proposed architecture, is one example of the different ways being developed to convert silicon resources into application performance. Earlier WaveScalar work demonstrated its potential to outperform end-of-the-road superscalars and compete in the multi-threaded design space. However, WaveScalar is a highly unusual design, utilizing hundreds of ALU cores and specialized and distributed memories. It might be appropriate to ask if WaveScalar can be built with current or even tomorrow's silicon technology? The following discussion addresses the buildability of WaveScalar's micro-architecture, which is referred to herein as the WaveCache. An RTL level design of the major WaveCache components is presented, and it includes: an execution core, a memory subsystem and a primary interconnect. Using a synthesizable implementation of this micro-architecture and a detailed instruction-level simulator, the area/performance trade-offs of alternative configurations of these components has been explored. The results show that a high-performance "desktop" WaveCache processor core requires only a 160 mm$^2$ die using current generation 90 nm process technology. Furthermore, the same architecture and micro-architecture can effectively be scaled down to 10 mm$^2$ for portable computers and up to 430 mm$^2$ in 75 nm technology for high-end systems. These designs achieve up to 2.3 IPC on single-threaded SPEC, 17-50 IPC on multi-threaded Splash-2, and up to 120 IPC on dataflow kernels.

Introduction—A Definition of Waves and WaveScalar Architecture

Several scaling trends frustrate attempts to build ever larger versions of conventional microprocessors. Among them are the increasing disparity between on-chip computation and communication performance—fast transistors but slow wires; the enormous complexity of conventional designs, leading to larger design teams, schedule slips and processor bugs; and the decreasing reliability of the manufacturing process itself and the inability of essentially fragile and complex designs to tolerate a single defective transistor or wire in certain components. WaveScalar architecture, which is employed in the present invention, directly confronts these challenges.

A WaveScalar compiler breaks the control flow graph of an application into pieces called "waves." Conceptually, a WaveScalar processor executes a wave at a time. Waves can be different sizes and defined by different properties. An exemplary set of properties are that: (1) each time a wave executes, each instruction in the wave executes at most once; (2) the instructions in the wave are partially ordered (there are no loops); and (3) control can only enter at a single point. Formally, these three properties define a wave to be a connected, directed acyclic portion of a control flow graph with a single entrance. These properties enable the compiler to reason about memory ordering within a wave.

Waves are similar to hyper-blocks, but can be larger, because they can contain control flow joins, which reduces the amount of overhead due to wave management and makes parallelism easier to extract. In addition, simple loop unrolling is sufficient for generating large waves, whereas hyper-block generation requires heuristics for basic block selection and extensive code replication.

The WaveScalar compiler (or a binary translator) partitions an application into the maximal number of waves and adds several wave management instructions. The pieces of the control flow graph (i.e., the waves), the tags that identify individual instances of data, which include a wave number (described below), and the wave management instructions comprise a tag management system that is controlled by the instruction set architecture.

Wave Numbers

A significant source of complexity in WaveScalar is that instructions can operate on several instances of data simultaneously. For example, consider a loop. A traditional out-of-order machine can execute multiple iterations simultaneously, because instruction fetch creates a copy of each instruction for each iteration. In WaveScalar, the same PE handles the instruction for all iterations. Therefore, some disambiguation must occur to ensure that the instruction operates on values from one iteration at a time.

Traditional dataflow machines use tags to identify different dynamic instances. In WaveScalar, every data value carries a tag. Tag management is aggregated across waves and wave numbers are preferably used to differentiate between dynamic waves. A special instruction, WAVE-ADVANCE, manages wave numbers. The WAVE-ADVANCE instruction takes a data value as input, increments the wave number and outputs the original data value with the updated wave number. Because WAVE-ADVANCE is such a simple operation, it can be combined with other instructions. For instance, WaveScalar has an ADD WITH-WAVE-ADVANCE instruction.

At the top of each wave there is a WAVE-ADVANCE node for each of the wave's live input values. These nodes reside at the entrance to the wave and increment the wave numbers for each input value. As they leave the WAVE-ADVANCE instructions, all values have the same wave number, since they all came from the same previous wave. In the case of a loop, the values of one iteration percolate through the loop body, and the back-edges to the top of the loop lead to the WAVEADVANCE instructions. These instructions compute the wave number for the next iteration and ensure that each iteration has a different wave number.

A key feature of WaveScalar is that the WAVE-ADVANCE instructions enable wave-number management to be entirely distributed and under software control, which is in contrast to traditional dataflow machines in which tag creation is either partially distributed or completely centralized. This fact can be exploited to optimize WaveScalar binaries by creating application-specific tagging schemes.

Indirect Jumps

Modern systems rely upon object linking and shared libraries, and many programs rely upon indirect function calls. Supporting these constructs requires an additional instruction, INDIRECT-SEND, with three inputs: a data value (i.e., a function argument), an address, and an offset (which is statically encoded into the instruction). It sends the value to the consumer instruction located at the address plus the offset.

Using this instruction, it is possible to both call a function and return values. Each argument to the function is passed through its own INDIRECT-SEND instruction. At the start of a function, a set of instructions receives these operands and starts function execution. The caller sends the return address to provide the target address for an INDIRECT-SEND that returns the function's result. The address of the called function need not be known at compile time. A very similar mechanism allows for indirect jumps.

Memory Ordering

Traditional imperative programming languages provide the programmer with a model of memory known as "total load-store ordering." WaveScalar brings load-store ordering to dataflow computing using wave-ordered memory. Wave-ordered memory annotates each memory operation with its location in its wave and its ordering relationships (defined by the control flow graph) with other memory operations in the same wave. As the memory operations execute, these annotations travel with the memory requests and enable the memory system to apply the memory operations in the correct order.

Figure 1D:
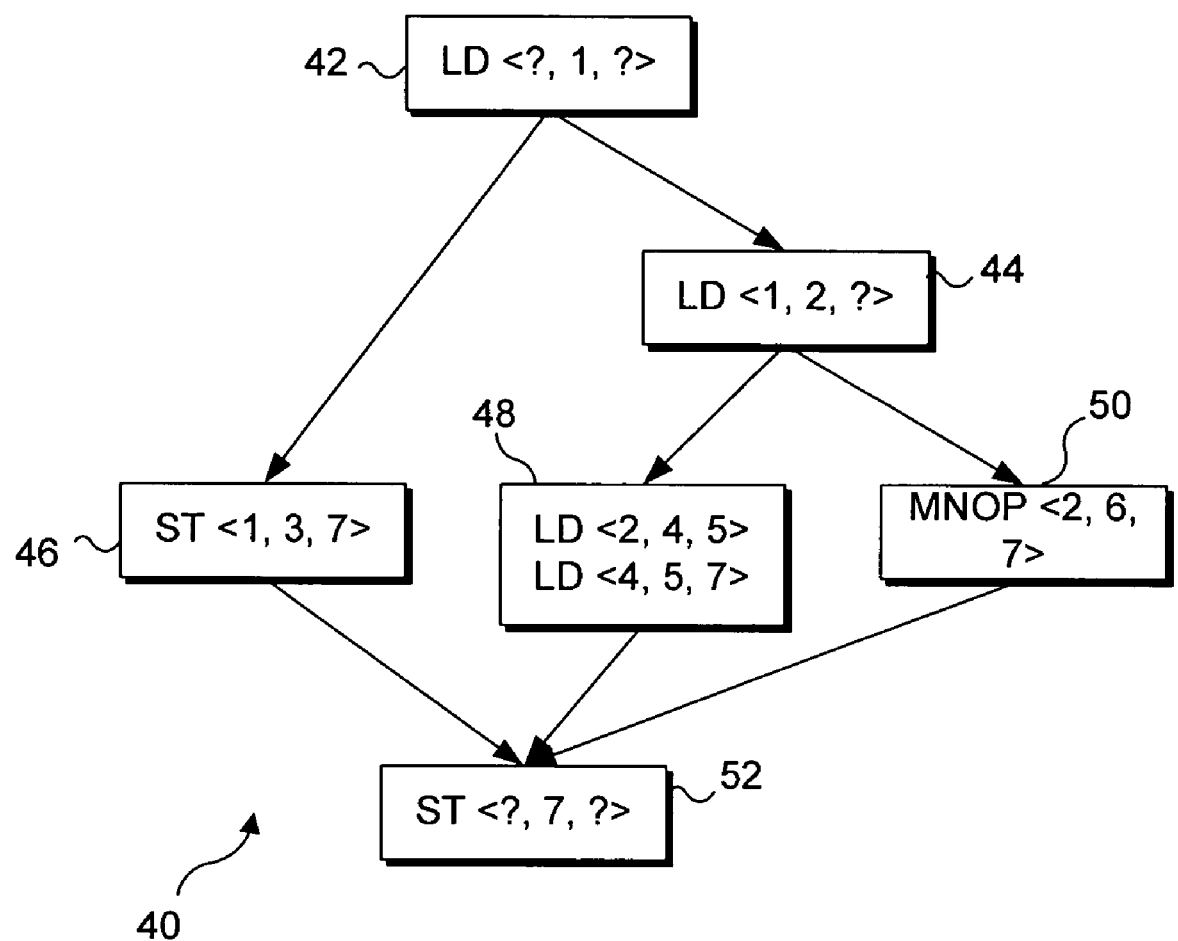
FIG. 1D illustrates several exemplary annotated memory operations that may occur in a wave.

To annotate memory instructions in a preferred embodiment, the WaveScalar compiler statically assigns a unique (within a wave) sequence number to each memory operation by traversing the wave's control flow graph in breadth-first order. Within a basic block, memory operations receive consecutive sequence numbers. By assigning sequence numbers in this way, the compiler ensures that sequence numbers increase along any path through the wave. Next, the compiler labels each memory operation with the sequence numbers of its predecessor and successor memory operations, if they can be uniquely determined. Branches and joins may make this impossible, because they can create multiple successors or predecessors for a single memory operation. In these cases, the compiler uses a special wildcard value, '?', instead. The combination of an instruction's sequence number and the predecessor and successor sequence numbers form a link, which is denoted <pred, this, succ>. FIG. 1D provides an example 40 of annotated memory operations in a wave. These memory operations include a load operation 42, a store operation 46, dual load operations 48, and a store operation 52. Also shown is a memory No-Operation instruction, i.e., MNOP 50, the purpose of which is explained below. Each memory operation includes a predecessor number, its number, and a successor number, e.g., in store memory operation 46, ST<1, 3, 7>, 1 is the predecessor number, 3 is the current number, and 7 is the successor number. This relationship should be clear from the example shown, since load memory operation 42, LD<?, 1,?> is the predecessor of store memory operation 46, while store memory operation 52, ST <?, 7,?> is its successor.

The links encode the structure of the wave's control flow graph, and the memory system uses this information to apply operations in the correct order and enforce the load-store ordering the programmer expects. When a memory instruction executes, it sends its link, its wave number (taken from an input value), an address, and data (for a store) to the memory. The memory system uses this information to assemble the loads and stores in the correct order to ensure that there are no gaps in the memory sequence. This result is possible because the current wave number in combination with the memory instruction's sequence number totally orders the memory operations through any traversal of a wave, and, by extension, an application. The memory system uses the predecessor and successor information to detect gaps in the sequence. The memory system can be sure that a gap does not exist, if, for each memory operation, M, in the sequence, either M's succ number matches the sequence number of its next operation, or M's succ is '?' and the next operation's pred field matches M's sequence number.

To ensure that gap detection is always possible, it is necessary to enforce a no gap rule, i.e., no path through the program may contain a pair of memory operations in which the first operation's succ value and the second operation's pred value are both "?". If a violation of the rule occurs, the compiler adds a MEMORY-NOP instructions, such as MNOP 50, to remove the ambiguity. Thus, the MNOP instruction serves as a placeholder memory instruction to a path between a control flow branch and a merge that includes no memory operation. These instructions participate in memory ordering, but otherwise have no effect. In experiments that have been carried out, MEMORY-NOP's are rare (fewer than 3% of instructions).

Wave-ordered memory is the key to efficiently executing programs written in conventional languages. It enables WaveScalar to separate memory ordering from control flow by succinctly annotating the memory operations with information about their location in the control flow graph. The PEs are freed from managing implicit dependencies through memory and can treat memory operations just like other instructions. The sequencing information included with memory requests provides a concise summary of the path taken through the program. The memory system can use this summary in a variety of ways. Currently, it is assumed that a wave-ordered store buffer is available. Alternatively, a speculative memory system could use the ordering to detect misspeculations, or to facilitate memory alias detection.

In addition to being applied to waves with the exemplary properties defined here, wave-ordered memory can also be used with pieces of the control flow graph that are otherwise defined. Since wave-ordered memory is driven by the software, it can be enabled to insure total load-store order or disabled to increase the amount of parallelism, thus increasing performance. Control of wave-ordered memory can be applied either across different applications or within the same application, and can also be applied in either dataflow or von Neumann computers.

The most exciting aspect of wave-ordered memory is the incorporation of instruction order into the instruction set as a first-class entity. However, the above scheme for assigning sequence information only encodes information about dependencies between memory operations. It is possible to devise a more general scheme that also expresses independence among memory operations (i.e., that two memory operations can proceed in any order). An ISA that incorporates such a scheme could use memory aliasing information from the compiler to expose a large amount of memory parallelism to the hardware. In any case, it will be understood that wave-ordered memory is contemplated to apply to any PE with the capability to execute instructions out of order.

Wave Cache

A WaveScalar processor, called a WaveCache, comprises a large number of simple PEs that are distributed across a silicon die. In a preferred implementation, the PEs are grouped hierarchically into domains, within which each PE can communicate with any other PE in a single cycle. Domains are grouped into one or more clusters, and each cluster contains an L1 data cache and a store buffer for access to program memory. Clusters are tiled across the die and communicate with each other over a dynamically routed packet network. Applications are mapped onto this grid of PE resources at runtime to reduce, as much as possible, the physical communication distance operands must travel.

WaveScalar was specifically designed to address the scaling trends silicon technology faces. Two factors minimize expensive communication. First, the WaveCache presents a very finely grained distributed implementation for WaveScalar's dataflow architecture, providing direct and low cost, point-to-point communication between producer and consumer instructions.

Second, the WaveCache's hierarchical structure and locality-sensitive instruction placement keep instructions that communicate frequently near each other in physical space. As a result, the WaveCache contains no large broadcast forwarding networks like those found in traditional superscalars. Design time is minimized by reducing the unit of complexity to a cluster of simple PEs. Once designed, this cluster can be simply replicated across the die. The micro-architecture within clusters and domains is similarly regular, providing the same replication capability there. Finally, WaveCache architectures can easily tolerate manufacturing defects. Defective PEs are not used for computation and instruction/data flow is routed around defective network switches by the dynamic network. Complementing these design benefits are performance results that demonstrate that WaveCache architectures can achieve speedups of 3× over well-provisioned superscalars on single-threaded applications and 1.75-12× over SMTs and CMPs on coarse-grain parallel programs.

Major portions of the WaveCache have been designed, including the PE, the domain network, the cluster, the memory interface and the inter-cluster dynamic router in SystemC™. These components have been synthesized using the latest tools from Synopsys, Inc. In addition, a detailed cycle-level simulator was constructed that accurately models the architecture implemented by the SystemC model and enables the cycle-level performance of different design points to be "quickly" explored (compared to re-implementing in SystemC).

Using this software infrastructure, the following issues are addressed below with far more precision:

Can the WaveCache, with its huge number of PEs, really be built?

What is the detailed micro-architecture of a processing tile and the memory interface?

What are the correct trade-offs between area and performance in different portions of the WaveCache architecture?

How do circuit-level constraints alter the micro-architecture of the WaveCache, and, conversely, what design opportunities are revealed by the synthesizable model that were not immediately apparent in a high-level architectural design?

Will the clock cycle be comparable to conventional designs?

The answers to these questions have produced a high performance "desktop" WaveCache processor core that requires only a 160 mm$^2$ die using current generation 90 nm process technology. Furthermore, the same architecture and micro-architecture can effectively be scaled down to 10 mm$^2$ for portable systems and up to 430 mm$^2$ (in 75 nm technology) for high-end computing. These designs achieve up to 2.3 IPC on single-threaded SPEC, 17-50 IPC on multi-threaded SPLASH2, and up to 120 IPC on dataflow kernels.

The next section overviews the WaveScalar architecture and WaveCache micro-architecture introduced in earlier work. Also disclosed below are the methodology and tool infrastructure used to build the WaveCache and gather the results. The next three sections present a detailed design and evaluation of the micro-architecture of WaveCache's major components: the execution core, the memory subsystem, and the network switch. All of these results are then synthesized to present three different WaveCache architectures, each targeted to a different market sector, including: portable devices, the desktop, and high-performance machines.

Overview of WaveScalar Architecture and WaveCache

This section provides an overview of the WaveScalar architecture and its WaveCache implementation. This discussion of the architecture is confined to those features that provide context for the RTL-level implementation presented herein. A more in-depth description of the architecture appears in the first filed of the above-referenced provisional patent applications, and detail on each component of the micro-architecture appears below.

WaveScalar is a dataflow architecture. Like all dataflow architectures, its binary is a program's dataflow graph. Each node in the graph is a single instruction that computes a value and sends it to the instructions that consume it. Instructions execute after all input operand values have arrived, according to a principle known as the dataflow firing rule. Unlike other dataflow architectures, however, WaveScalar supports a memory model known as total load-store ordering.

Equipped with architectural building blocks, called waves, which globally order pieces of the control flow graph, and an architectural mechanism, called wave-ordered memory, which orders memory operations within a wave, WaveScalar provides a program with a correct global ordering of all its memory operations.

Micro-Architecture

Conceptually, a programmer views WaveScalar instructions as all simultaneously active, each executing in a separate PE. Clearly, building a PE for each static instruction is both impossible and wasteful, so, in practice, multiple instructions are dynamically bound to a fixed-number of PEs, and they are swap in and out, as needed. The PEs are thus said to cache the working set of the application. Hence, the micro-architecture that executes WaveScalar binaries is called a WaveCache. FIGS. 1A-1C illustrate how a WaveScalar program, shown in FIG. 1A can be mapped as shown in FIG. 1B, into a Wave-Cache 30, as shown in FIG. 1C. As shown in FIG. 1C, the exemplary domain of WaveCache 30 includes 16 PEs 32, only eight of which are used for executing the exemplary WaveScalar program. The WaveCache also includes cache/store buffers 34a and 34b.

Each PE includes a functional unit, specialized memories to hold operands, and logic to control instruction execution and communication. It also contains buffering and storage for several different static instructions, although only one can fire each cycle. A key advantage of this design is that it avoids the centralized, associative tag matching stores that make prior art dataflow architectures non-scalable, since each PE handles tag matching for its own instructions.

Figure 2:
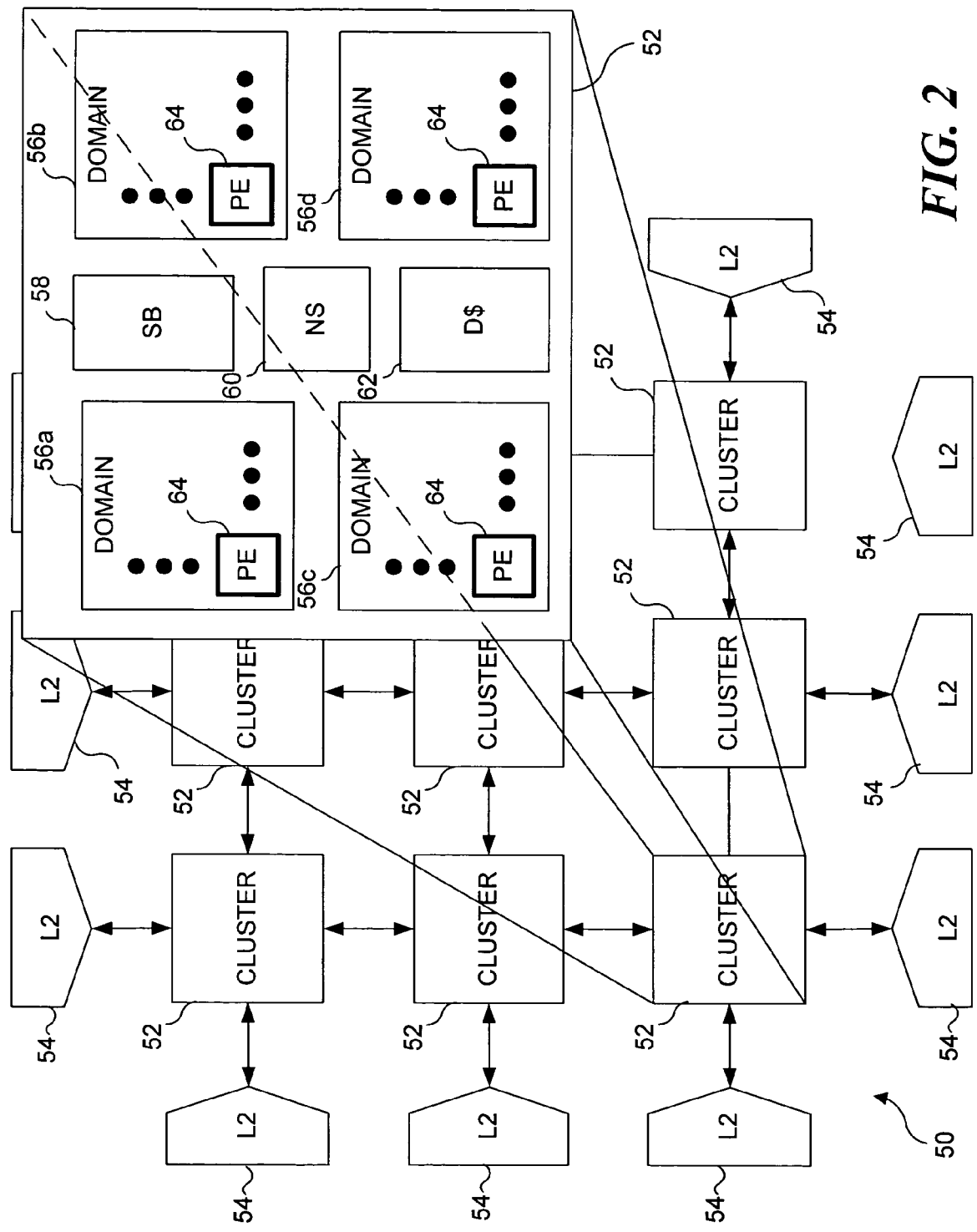
FIG. 2 is a schematic diagram of an exemplary 3×3 Wave-Cache with nine clusters and a detail inset of one cluster, which includes four domains with 16 PEs in each domain.

To reduce communication costs within an exemplary WaveCache grid 50, PEs 64 are organized hierarchically, as depicted in FIG. 2. PEs are first grouped into domains. The example illustrated to the upper right shows domains 56a, 56b, 56c, and 56d. Within each domain, instructions execute and send their results to a consuming PE within a single cycle. The four domains are grouped into a cluster 52, which also includes wave-ordered memory hardware (in a store buffer 58), a network switch (NS) 60, and an L1 data cache (D$) 62. A single cluster, combined with an L2 cache 54 and traditional main memory, is sufficient to run any WaveScalar program. To build larger machines in accord with the present invention, multiple clusters 52 are connected by an on-chip network (not shown in detail in this Figure), and cache coherence is maintained by a simple, directory-based protocol. The coherence directory and the L2 cache are distributed around the edge of the grid of clusters.

Methodology

The prior work that initially developed the concept of the WaveScalar architecture included a fairly high-level view of its implementation, the WaveCache. The following discussion focuses on the low-level implementation, and the architectural concerns and benefits derived from it. To this end, a far more detailed micro-architectural implementation of the WaveCache has been designed, which is sufficiently detailed to support RTL-level synthesis. This design is described and explored below.

To facilitate this exploration, two new artifacts have been built, including: a synthesizable SystemC model of the Wave-Cache, and a matching cycle-accurate instruction-level simulator that measures application performance. The design space exploration methodology employed couples results from both synthesis and simulation.

Synthesizable Model

The synthesizable model is written in SystemC, version 2.0.1. SystemC is a widely popular architectural exploration and simulation tool that enables micro-architects to rapidly explore the design space and logically verify designs. A restricted subset of SystemC is synthesizable, and hence SystemC can be used in place of Verilog or VHDL as a hardware description language. A SystemC model of the WaveCache was written in this synthesizable subset.

From this synthesizable SystemC model, the Synopsys DesignCompiler and DesignCompiler Ultra were used for logical synthesis. DesignCompiler can translate SystemC into a number of HDL formats, including Verilog and VHDL, which enables Verilog IP models, such as SRAM cells and functional units, to be inserted into the design. Some of the DesignCompiler-generated Verilog code was also tuned by hand. The manual changes did not alter the functionality of the implementation, but simply prepared the code for synthesis. Examples include inserting Verilog IP modules where appropriate and removing obvious inefficiencies in the DesignCompiler output. DesignCompiler relies upon later optimization steps to remove temporaries and decrease bitwidths. It was found to be much faster to synthesize the design, if done up-front by carefully structuring the SystemC model and by writing PERL scripts that addressed obvious DesignCompiler inefficiencies.

Application Specific Integrated Circuit (ASIC) Design Flow

The design rules for manufacturing devices have undergone dramatic changes at and below the 130 nm technology node. Issues such as crosstalk, leakage current, and wire delay have required synthesis tool manufacturers to upgrade their infrastructures. The data presented below are derived from the design tools specified by Taiwan Semiconductor Manufacturing Company's TSMC Reference Flow 4.0™. These tools were specifically selected to handle the increased complexity of 130 nm and smaller designs. Using these up-to-date tools and technology libraries ensures, as much as possible, that the results will scale to future technology nodes.

As a result of the new design rules, designs at and below 130 nm are extremely sensitive to placement and routing. Therefore, the area or delay numbers that are produced after logical synthesis by DesignCompiler™ were not used. Instead, its generated netlist was input into Cadence Encounter™ for floor planning and placement, and then used Cadence NanoRoute™ for routing. After routing, the appropriate area values were extracted. Encounter™ was used to extract the resistance and capacitance values, and to produce the net timing information. This information was then fed into Synopsys PrimeTime™ for static timing analysis.

Standard Cell Libraries:

The design used in a preferred embodiment of the present invention uses the standard cell libraries from a 90 nm process. The 90 nm process is the most current process available and hence, represents the best target for extracting meaningful synthesis data. The cell libraries contain all of the logical components necessary for synthesis in both low-power and high-performance configurations. For this study, the high-performance cells were used exclusively for all parts of the design, although clearly, portions of the design that are not timing critical should later be implemented using the low-power cells to reduce overall chip power consumption.

As a natural consequence of using the most current tools and libraries, not all the components are available for academic use. In the present case, the only unavailable tool for the 90 nm process was a memory compiler. Because of this constraint, the memory in this design is a mixture of SRAM memories generated from a 130 nm memory compiler, and Synopsys DesignWare IP™ memory building blocks. The memory compiler used generates a custom SRAM that matches prior published results for memory-compiler based designs. The total size of these SRAMs are approximately twice the size of reported "cell size" area from Intel™ and others. The SRAM result data for the present invention, however, account for all required periphery circuitry, such as power rails and address decoding logic. This SRAM data is used unscaled from the 130 nm technology node, rather than attempting to estimate area and delay numbers for 90 nm technology, which makes the results slightly pessimistic.

The memory-compiler SRAMs were used only in the cache-memory system of the present design. DesignWare IP™ was used for all other memory blocks. The best estimates suggest that, if the memory-compiler were used for all SRAMs, it would further reduce these DesignWare IP™ modules by at least 50%. Again, the conservative approach was chosen, and actual results were reported from the synthesis, using DesignWare IP™.

Cycle-Level Functional Simulation

While the goal of SystemC is to unify synthesis and high-level simulation languages, in practice the tool infrastructures are not yet up to the task. In order to generate a high-quality ASIC from SystemC, the model must be written in the synthesizable subset and carefully structured to avoid gross inefficiencies introduced by the synthesis tools. Consequently, the model is not as parameterized as higher-level architectural simulators. Therefore, in conjunction with the SystemC model design, a corresponding cycle-accurate, instruction-level simulator was built.

The simulator models each major subsystem of the Wave-Cache (execution, memory, and network) and is used to explore many aspects in more detail. To drive the simulations, a suite of applications was executed, as described below. These applications were compiled with the DEC Alpha CC™ compiler and then binary translated into WaveCache binaries.

Applications

Three groups of workloads were used to evaluate the Wave-Cache, each of which focuses on a different aspect of Wave-Cache performance. To measure single-threaded performance, a selection of the Spec2000™ benchmark suite (art, equake, gzip, mcf and twolf) was chosen. To evaluate the effect of multiple threads, three of the Splash2™ benchmarks: lu, ocean, and radix were used. These subsets of the two suites were chosen because they represent a variety of workloads and the binary translator-based tool-chain can handle them. Finally, three hand-coded kernels were used, including: mmul (matrix multiplication), lcs (longest common subsequence), and fir (a finite input response filter). These kernels exploit novel aspects of the WaveScalar architecture, such as its unordered interface to memory and its ability to spawn extremely fine-grained threads. Each workload run was between 10-200 million instructions.

TABLE 1

Key architectural parameters of the baseline WaveCache configuration.

| Parameter | Value |
|---|---|
| WaveCache Size | 4 × 4 Clusters |
| Domain | |
| PEs | 8 |
| intra-domain busses | 8 |
| PE | |
| Matching table rows | 8 |
| Virtual instructions/PE | 16 |
| Output queue length | 8 |
| PE inputs per cycle | 3 |

TABLE 1-continued

Key architectural parameters of the baseline WaveCache configuration.

| Parameter | Value |
|---|---|
| Network | |
| Cluster switch width | 4 |
| Domains/Clusters | 4 |
| Store Buffer | |
| L1 Cache size | 16 KB |
| L1 Hit Time | 1 cycle |
| L1 Cache Associativity | 4-way |
| L2 Cache size (total) | 4 MB |
| L2 Associativity | 4-way |
| L2 Hit time | 20 cycles |
| L2 Miss time | 1000 cycles |

The Baseline WaveCache

For the performance studies of the present invention, a baseline WaveCache design was needed to use as a point of comparison. Rather than use a small or untuned and potentially unbalanced WaveCache configuration that might misrepresent (i.e., inflate) the relative benefit of particular design changes, the best methodology was believed to use the WaveCache design with the best area-performance tradeoff. To determine the parameters of this "ideal" design, every micro-architectural feature described in below (and other) were fine tuned, and from this data, obvious knee points on the performance curves were identified, with an eye towards their impact on total chip area. Since no feature effects performance in isolation, this parameter tuning process was repeated multiple times, each time bringing the parameters closer to ideal. The final studies, as described herein, vary micro-architectural features relative to this well-tuned baseline design. Table 1, which is included above, contains the settings for the baseline architecture. All the parameters are either self-explanatory or discussed in detail below.

The next three sections present the designs of the main components of the WaveCache, including its hierarchy of PEs, the memory subsystem and the interconnection network. Each of these components is analyzed in turn, evaluating the effect on overall performance of changes to their design and examining the trade-off between performance and area.

Execution System

WaveCache's execution subsystem is provided by a plurality of PEs. As shown by way of example in an overall view of FIG. 3, each PE 64 includes an instruction execution control 70 (or input control), a tag table 72, a matching table 74 (which serves as the operand input queues for a PE), an arithmetic logic unit (ALU) 78, an instruction firing queue 80, an instruction store 82, an output queue 84, and an output network interface 88.

In broad terms, a PE's core operation proceeds as follows. Each cycle, messages arrive from other PEs. Each incoming message contains a tagged source operand data value, which is stored in the PE's matching table 74 and tag table 72. The matching table logic determines if all inputs for an instruction are present, as indicated in a block 76, and, if so, places a pointer to its matching table entry in instruction firing queue 80. An instruction firing control unit (not separately shown) monitors this instruction firing queue and dispatches one set of complete operands to ALU 78. The ALU computes an output and sends it to output queue 84, for subsequent broadcast through output interface 88 to nearby PEs.

The Matching Table

Matching table 74 is responsible for holding operands for instructions until the operands required for an instruction's execution have arrived. Therefore, it serves a similar purpose to an issue buffer in a conventional superscalar, although it is constructed differently.

There were two key challenges in designing the Wave-Cache matching table: (1) emulating a potentially infinite table with a much smaller physical structure; and (2) performing tag matching without content associative memories (CAM). The first situation arises because WaveScalar is a dynamic dataflow architecture. Consequently, it places no limit on the number of dynamic instances of a static instruction that have unconsumed inputs, a particularly useful feature for implementing recursion. The second challenge, eschewing CAMs, aims to avoid costly hardware. One of the primary downfalls of past dataflow machines were their large (and slow) token stores.

To address these challenges, each PE's matching table is configured as a specialized direct-mapped cache for a larger in-memory matching queue. Operands arrive tagged with a unique instance value. A hash of this tag is used to index into the matching table. When the operand and matching table entry tags match, the operand is stored into the table. When the tags do not match, the operand triggers an overflow mechanism, as described below.

Figure 4:
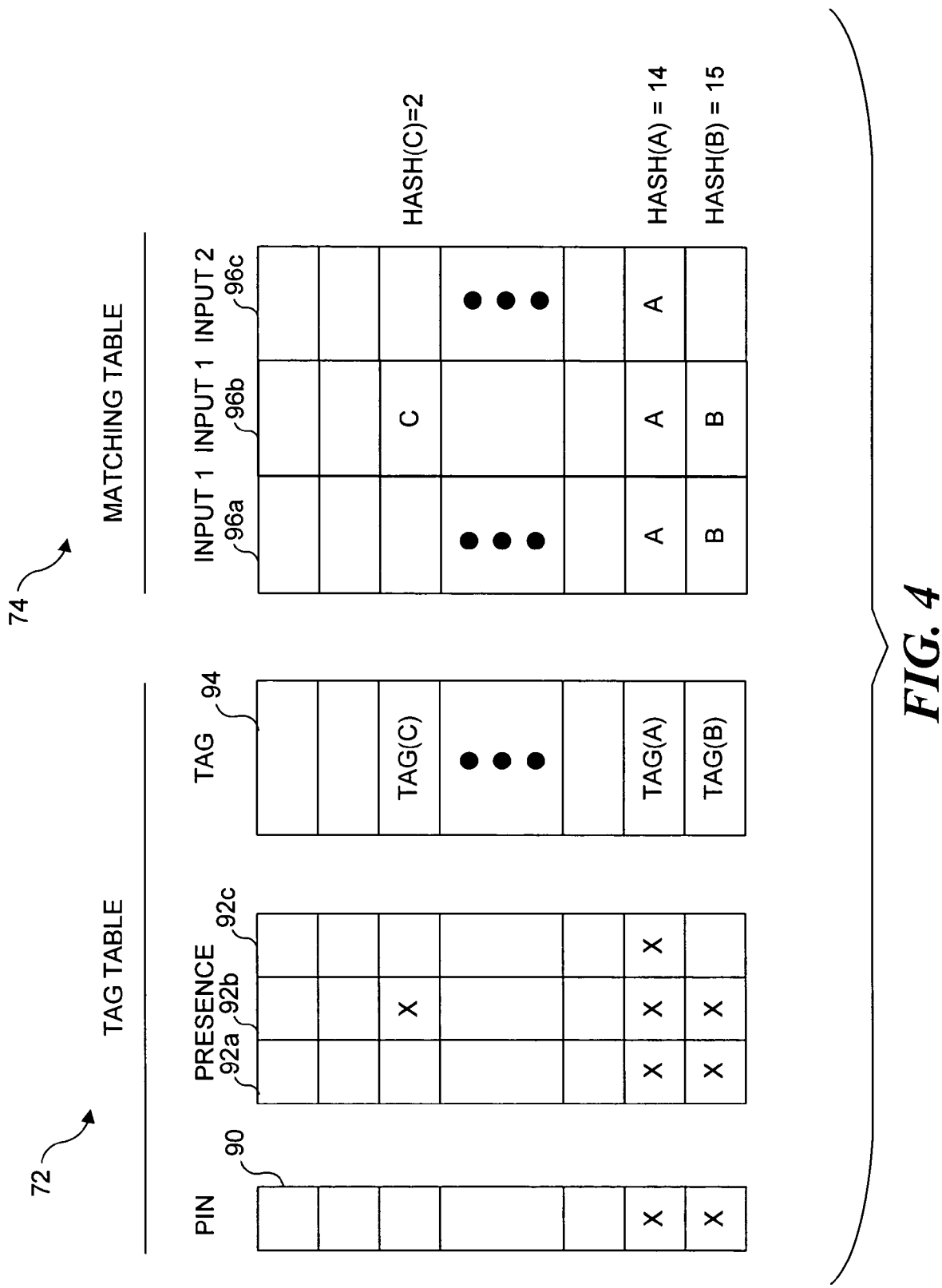
FIG. 4 is an exemplary matching table, wherein "A," "B," and "C" are three instruction instances, and "A" and "B" are ready to fire, but "C" must wait for additional inputs.

Instructions in WaveScalar can take an input comprising up to input three operands. (Several WaveScalar-specific instructions, such as those that merge values at a control flow join, require three operands.) In order to improve throughput without much increase in area, the matching table is banked into three columns 96a, 96b, and 96c, as shown in FIG. 4. Each column corresponds to a given input operand. The matching logic and tag array supports up to three operand matches per cycle, so long as they are to different operand numbers.

Figure 3:
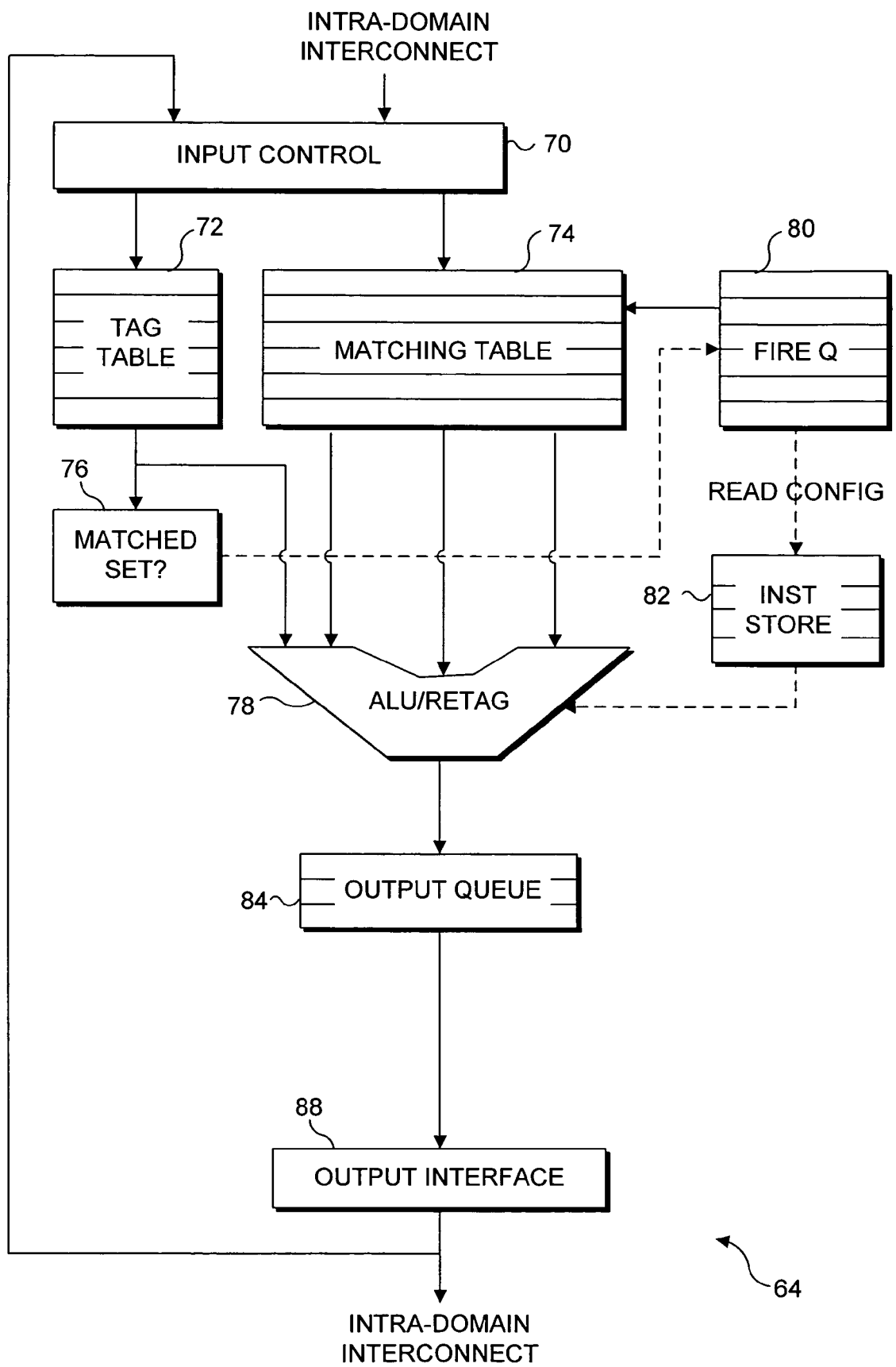
FIG. 3 is a schematic diagram of an exemplary PE, wherein solid lines represent message busses, and dotted lines are control signals.

Under this scheme, an instruction can fire if a data value is present in all of the entries of one row of matching table 74 (or the correct subset of entries, if the instruction has fewer than three inputs). Once an instruction fires, there are two possibilities. If the functional unit is otherwise idle that cycle, the other values are read from the matching table and all are forwarded to ALU 78 (see FIG. 3). Otherwise, that row of values is pinned in place, with an entry in a pin column 90, and the row number is written to instruction firing queue 80 (FIG. 3).

FIG. 4 shows the state of matching table 74 after several data values have arrived (shown in presence columns 92a, 92b, and 92c of tag table 72). Three inputs to instruction A shown in a tag column 94 have arrived with the same tag, so A is ready to fire (and its index is waiting in the fire queue). The row of the matching table that contains the inputs is pinned in place, as indicated by the X in pin column 90. Similarly, instruction B is ready to fire, but has only two inputs, so they are also pinned in place with an entry in pin column 90 for instruction B. A single input for instruction C has arrived, as shown in presence column 92b, but C requires more than one input, so it is not yet ready to fire. If an input for instruction D (not shown) arrived and had a conflicting hash to C, C would be written to memory to make room for D's inputs. However, if instruction D had conflicted with the pinned A or B, then D's inputs would have gone back to the sending PE.

The overflow mechanism that handles matching table conflicts is a small state machine on the edge of a domain, which over the course of many clock cycles, drains the PE of the operands at the conflicting entry and inserts the newly arrived operands in its place. The old operands are written to memory; any operands in memory that match the new tag are resent to the PE. This entire operation can require many 10's to 100's of clock cycles, depending upon whether the reads/writes to memory hit in the L1 data cache.

Figures 5A, 5B:
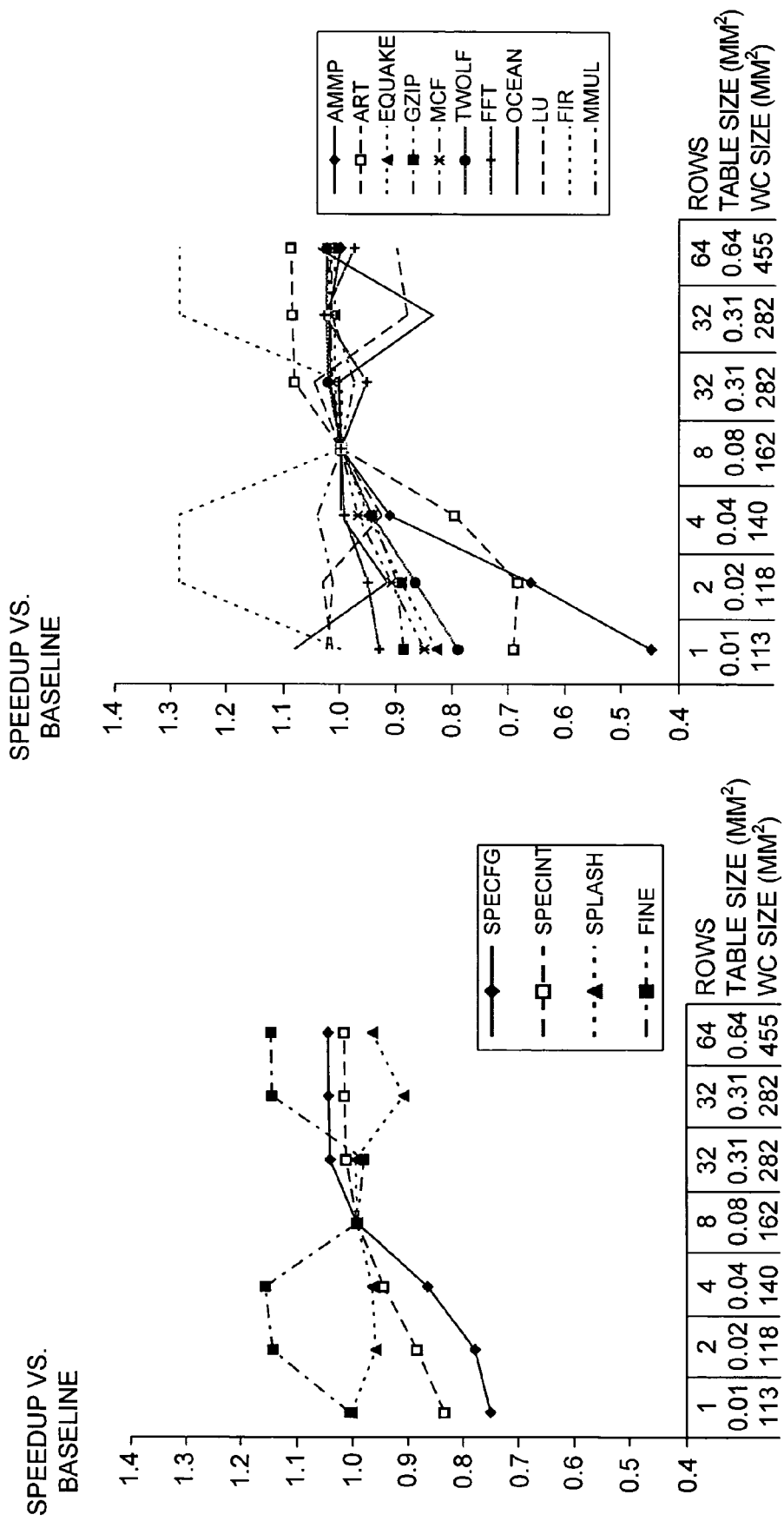

Matching Table Size:

In an empirical test, the size of the matching table was varied from 1 to 64 rows. FIGS. 5A and 5B show the effect of the different sizes of the matching table on the performance of the present invention. The matching table and all of the performance graphs show speedup relative to the baseline configuration on the vertical axis, while the horizontal axis has three rows of labels. The first row varies the size hardware structure being investigated (the size of the matching table, in this case). The second and third rows along the horizontal axis show the area of the structure in isolation and the size of the entire WaveCache, respectively. The advantage of a larger matching table is of course fewer collisions; the penalty to write out the current contents of a row of the matching table can be significant.

The data show that there is a definite limit to this benefit. For the Spec applications, there is a clear knee in the speedup curves at 8 rows in the matching table. The Art application was unusually sensitive to matching queue size. With one entry, its miss rate is 40%, but the miss rate dropped to just 8% with 32 entries, and performance increased by 55%. For the Splash application, the number of rows in the matching table has little effect. The analysis of the fine-grained applications, fir in particular, is more complex. The behavior of the matching table is highly timing-dependent. A difference in arrival time of just a single cycle can change whether a message will hit or miss in the matching table. Changing the matching table size, therefore, can have a non-intuitive effect on performance. Larger matching tables might allow one PE to fire instructions more quickly, increasing pressure and, therefore, miss rates at other PEs.

The matching table in the baseline design makes up 35% of a PE's area and all PE matching tables comprise 24% of the entire processor chip. Varying matching table size reduces these area figures to 12% and 4% for the smallest matching table and increases them to 81% and 72% for the largest. The performance data show that very large matching tables offer no or little benefit, especially when the required increase in cycle time is taken into account. However, smaller matching tables would be useful for light-weight applications, such as those executed in hand-held processors.

Instruction Store

Each PE can hold more than one static instruction, a concept known as virtualization in distributed micro-architectures. WaveCache's instruction store 82 (FIG. 3) contains a decoded version of its static instructions. Increasing the size of the instruction store increases the capacity of the Wave-Cache, reducing WaveCache misses, but potentially increases contention for the PE's functional unit. The baseline PE's instruction store 82 holds 16 instructions. Since it is updated infrequently, a single read/write port suffices to access the instruction store.

Instruction Execution Control

The instruction firing control unit works closely with the matching table and the instruction store to feed operands to the functional unit. The unit contains instruction firing queue 80, which indexes into the matching table to locate operands that are ready for execution.

It was determined that a small instruction firing queue (four entries) captures all of the benefit of an infinitely large instruction firing queue. A small instruction firing queue is sufficient, because ready operands usually bypass it and are sent directly to ALU 78 for execution. In fact, empirical data show that the instruction firing queue is empty between 92 and 98% of execution cycles. At four entries, the area of instruction firing queue 80 is a negligible cost.

WaveCache Capacity

The number of static instructions the WaveCache can hold at one time should have a strong effect on performance, because WaveCache misses (i.e., when an instruction that is not present in the grid needs to be loaded and mapped to a PE) are expensive. There are several ways to increase Wave-Cache's capacity. While all of them reduce the WaveCache miss rate, each affects performance differently:

1. Increase PE virtualization—increasing the number of static instructions that reside at each PE also increases contention and possibly, the utilization of the functional unit in the PE.

2. Increase the number of PEs per domain—adding more PEs to each domain increases the size of the intra-domain interconnect, but may preclude single-cycle communication between PEs within a domain.

3. Increase the number of clusters—simply adding more clusters to the WaveCache is the simplest way to increase capacity, but additional clusters can also increase communication without smarter placement algorithms.

The baseline WaveCache use 16 virtual instructions per PE, holds 8K instructions, and contains 512 PEs.

The most area-efficient way to increase WaveCache capacity is to increase virtualization. Increasing virtualization (see horizontal axis of FIG. 7) should be most beneficial to performance when programs have large instruction working sets, and WaveCache misses are a significant cost. Doubling the virtualization to 32 increases the size of the baseline machine by 11% and reduces the Wave-Cache miss rates of fft, lu, and ocean (the only applications with significant WaveCache miss rates on the baseline configuration) by nearly half.

Interestingly, the same configuration increases fine-grain application performance by 48%, which is a consequence of an instruction placement algorithm being used that packs as many instructions as possible into each PE. The result is that fewer messages must leave the domains, reducing communication latency.

Increasing the number of PEs in a domain will also increase the WaveCache's capacity. The primary benefit of increasing the number of PEs is that it increases the number of processing resources available in the WaveCache. At the same time, it increases the complexity and reduces the speed of the intra-domain interconnect. FIG. 9 shows that doubling the number of PE in a domain (see horizontal axis) increases performance of our workloads applications by between 7% and 20%. It is estimated that the same modification would also increase the cycle time by 20%, resulting in no net performance improvement.

The final approach, increasing the number of clusters in the WaveCache, does not increase the cycle time, but does increase the area of the WaveCache linearly. FIG. 8 demonstrates that adding clusters (see horizontal axis) can improve performance, especially for the fine-grain applications. The danger of adding clusters to the WaveCache is increased communication latency due to sub-optimal placement. A larger WaveCache means instructions can be farther apart. A current preferred placement scheme does not take this fully into account. As a result, the Splash applications perform less well in an 8×8 grid than in a 4×4 grid (the baseline).

The Memory Subsystem

Waves and wave-ordered memory make WaveScalar the first dataflow machine capable of executing programs written in imperative languages, such as C, C++, or Java. The hardware support for wave-ordered memory lies in the Wave-Cache's store buffers. To motivate the purpose and design choices of the store buffer implementation, it will be helpful to briefly review the concept of wave-ordered memory and then examine the design of the store buffer and the other primary component of the memory subsystem, the L1 data cache.

Waves and Wave-Ordered Memory

As noted above, when compiling a WaveScalar program, a compiler breaks its control flow graph into pieces called waves. The key properties of a wave are: (1) its instructions are partially ordered (i.e., it contains no back-edges), and (2) control enters at a single point. Multiple waves comprised of the same static code (for example, iterations of a loop) may execute simultaneously. To distinguish these instances, each value in the WaveScalar ISA carries a tag, called a WAVE-NUMBER.

Wave-ordered memory enables WaveScalar to support memory ordering within a wave. In wave-ordered memory, the compiler uses the control flow graph (CFG) and the instruction order within basic blocks to annotate each memory operation with: (1) its position in its wave, called a sequence number; and (2) its execution order relative to other memory operations in the same wave. As the memory operations execute, these annotations travel to the memory system, enabling it to apply memory operations in the correct order.

Briefly repeating the exemplary algorithm that was explained above, to annotate each memory instruction in a wave, the WaveScalar compiler traverses the wave's control flow graph in breadth-first order. Within the basic block at each CFG node, it assigns consecutive sequence numbers to consecutive memory operations. Next, the compiler labels each memory operation with the sequence numbers of its predecessor and successor memory operations, if they can be uniquely determined. Since branch instructions create multiple predecessors or successors, the special wildcard value, "?", is used in these cases. The left side of FIG. 10 illustrates an example 110 of memory operations and their wave-ordered annotations 112, 114, 116, 118, 120, and 122.

During program execution, the memory system (in a preferred implementation, the store buffer) uses these annotations to assemble a wave's loads and stores in the correct order. FIG. 10 (center) shows how the wave-order annotations enable the store buffer to order memory operations in an ordering table 124 and detect those that are missing. Assume load memory instruction 122 with a sequence number 7 is the last instruction to arrive at the store buffer. Before its arrival, the store buffer knows that at least one memory operation between memory operations 114 and 120, i.e., numbers 4 and 8 is missing, because 4's successor and 8's predecessor are both "?". As a result, memory operation 120, i.e., number 8 cannot be executed. Load memory instruction 122, i.e., number 7's, arrival provides links 126 and 128 between memory operations 4 and 8, enabling the store buffer to execute both 7 and 8. Additional details of these concepts are provided in the first filed of the provisional patent applications noted above.

Store Buffers

The store buffers are responsible for implementing the wave-ordered memory interface that guarantees total load-store ordering and are distributed across the WaveCache, i.e., one per cluster in a preferred embodiment. To access memory, PEs send requests to their local store buffer. That store buffer will either process the request or direct it to another buffer. As described above, the store buffers use the wave-ordering annotations to apply memory operations in the correct order. All the memory requests for a single dynamic instance of a wave (for example, an iteration), including requests from both local and remote PEs, are managed by the same store buffer.

Store Buffer Hardware

In FIG. 11, the store buffer logic and structures needed for one wave are illustrated. Each store buffer has four independent copies of these structures and can process memory requests from up to four different dynamic waves of execution at once.

A store buffer assigns each wave ordering table 124 that holds up to 64 memory requests in a preferred embodiment. As requests arrive, they are written into the table according to their sequence number (i.e., operation n goes in row n of the table). A state machine tracks: (1) the location of the oldest unissued request (for example, memory operation 7 in FIG. 10); (2) the sequence number of the most recently issued request (memory operation 4); and (3) the sequence number of its successor, if known (currently unknown in FIG. 10). Every cycle, the state machine reads up to 4 requests following the oldest unissued operation from the ordering table, and checks to see which, if any, are ready to issue to the data cache.

FIG. 10 illustrates how these checks work for unissued memory operations 7 and 8. The store buffer ordering table shows that operations 3 and 4 have been issued to memory (cross-hatched), but that 7 and 8 have not because of unresolved wildcard values. A wildcard successor field (in this example, the "?" in request 4) is cleared up by a match between the sequence number of the last issued memory operation (request 4) and the predecessor field of the oldest unissued memory operation (value 4 in request 7); a wildcard predecessor field (for example, "?" in request 8) is resolved by a similar match between its sequence number (8) and the successor field of the next oldest memory operation (value 8 in request 7). The determination of whether to carryout memory operations 7 and 8 is shown in a logic diagram 130 on the right side of FIG. 10. This logic takes an input 132 for load memory instruction 122, which is split into blocks 134, 136, 140 and 144. Blocks 134 and 136 are logically ORed at 138, and the output of this logical evaluation, "fire 7?", is one of two values that are logically ANDed at 148. The values in blocks 140 and 144, which are provided with inputs 142 along with inputs 132, are logically ORed at 146 and the output is applied to the other ANDed input at 148. The AND operation produces an output "fire 8?".

In FIG. 10, both tests, which appear in bold, are true, and memory operations 7 and 8 can fire. The logic not in bold is activated when there are no wildcards. The ordering table is implemented as four interleaved RAMs to enable the four simultaneous, non-conflicting reads and writes with only one read and one write port per RAM.

The Data Cache

Each cluster contains a 16 KB, two-way set associative data cache. The data caches are the sole interface to memory, caching overflow values from the PE matching tables, in addition to program data. In a current implementation, all data caches use a simple directory-based cache-coherence protocol that does not support sharing to maintain a consistent view of memory. The directory resides within partitioned L2 cache 54 that surrounds the WaveCache's array of clusters 52 (see FIG. 2).

FIG. 13 shows the effect of L1 cache size on performance (see horizontal axis). For most applications, varying the cache size from 2 KB to 32 KB has little effect on performance. Interestingly, for some coarse-grain parallel applications, performance actually decreases with increasing cache size. In WaveScalar, sharing misses currently cost more than conflict or cold misses. As cache sizes increase more sharing misses occur and performance suffers, which clearly points to an area of future optimization work for WaveScalar research. Early data on developing a more complex coherency protocol suggests improvements between 5-90% are easily attainable.

The Network

Network switches 60 in clusters 52 form the on-chip network that moves operand values and memory coherence traffic around the WaveCache. As shown in the exemplary switch of FIG. 12, each switch has nine interfaces, one for each cardinal direction 160, 162, 164, and 166, i.e., inter-cluster busses 172, one for each domain 56a, 56b, 56c, and 56d in the cluster, i.e., domain output busses 170, and one for cache and store buffer 168, i.e., a memory bus 174. Each of these interfaces can send four messages per cycle and contains a 4-entry queue of out-bound messages. Routing through the switch takes one cycle, is deterministic, and is assured to be deadlock free using an approach described by W. J. Dally and C. L. Seitz, "Deadlock-free message routing in multiprocessor interconnection networks," *IEEE Transactions on Computers.*, vol. 36, no. 5, pp. 547-553, 1987.

The switch also contains special hardware (not specifically shown) to handle replicated high-fan out messages leaving the domains. It was found that the size of the instruction stores in the PE and wires in the switch interconnect could be substantially reduced if the network switch held the out-bound operand addresses, and the local PEs contained only indirection pointers. If an instruction in a domain needs to send copies of a data value to several locations outside the domain, it sends a single message to the switch. In a current implementation, the fan-out logic contains a 512-entry table of destinations, and the message contains an index into the table and a run-length. One copy of the message is sent to each destination in the range defined by the index and the run-length. Each destination is encoded as: a PE location, (x, y), an instruction number, and an input number, and requires 13 bits. The destinations are written into the table when the instruction is mapped into the domain. The empirical data show that 512 entries are sufficient.

The most important tunable parameter of the network switch is the number of messages it can accept and route from each input/output interface each cycle. The data show that most applications see little benefit from increasing the width of the network switch beyond four messages.

TABLE 2

| Parameter | WaveCache | | |
|---|---|---|---|
| | PDA | Desktop | Supercomputer |
| WaveCache Size | 1 × 1 clusters | 4 × 4 clusters | 8 × 8 clusters |
| | | Domain | |
| intra-domain busses | 4 | 8 | 8 |
| | | PE | |
| Matching table rows | 8 | 8 | 32 |
| Virtual instructions/PE | 16 | 16 | 64 |
| Output queue length | 2 | 2 | 8 |
| inputs to a PE per cycle | 1 | 2 | 2 |
| | | Store buffer | |
| L1 Data Cache size | 16 KB | 16 KB | 16 KB |
| | | Network | |
| Cluster switch width | 1 | 2 | 4 |
| Area | 10 mm$^2$ | 160 mm$^2$ | 620 mm$^2$ (430 mm$^2$ at 75 nm) |

Discussion

To summarize the analysis of the WaveCache micro-architecture, some of the questions raised in the introduction about WaveCache's intrinsic buildability are revisited, i.e., can the WaveCache, with its huge number of PEs, really be built? This question was raised by concerns that only limited numbers of PEs could reside on near-term chip sizes and that, despite the lack of large broadcast networks, the cycle time of the WaveCache would be slow. However, the small size of the WaveCache processor cluster was surprising. Empirical data demonstrate that a mid-range WaveCache, such as the 16-cluster desktop configuration described above in Table 2, has an approximate area of 160 mm² using current generation 90 nm process technology, indicating that it could be built today. A supercomputer-class WaveCache (with an area in the range of 430 mm², 75 nm technology) could built within the next few years. Therefore the answer to this question is a resounding "yes."

Performance on these machines is appropriate for their intended uses. The desktop version achieves up to 2.1 IPC for single-threaded applications (its current prevalent workload) and between 17 and 70 IPC for coarse- and fine-grain parallel applications (today's parallel workload). The supercomputer implementation, which is designed to maximize performance with multiple threads, achieves up to 50 IPC on coarse-grain parallel programs and 120 IPC on fine-grain, dataflow kernels. The portable WaveCache does less well, but it has a die area of only 10 mm².

Circuit-level issues had the most effect in the design of the intra-domain interconnect, where the practical constraints of wire delay limit the domain size to eight, which is not surprising, since it contains the slowest and most highly-utilized wires. In addition, it was found to be more efficient to break up the instruction store into components, some of which are stored at the PEs, with others at the network switch, which reduced the interconnect wiring within the cluster.

Many circuit elements from the SystemC™ model made their way back up to the micro-architectural design. The most significant of these is the design of the domain interconnect. Using a speculative arbitration scheme, the clock cycle has been reduced by an estimated 20%. In addition, the current bus structure more efficiently utilizes wiring resources than an earlier architectural design and yet achieves higher fan out.

A preferred embodiment of this design satisfies all critical-path timing constraints at 300 MHz, which is comparable to recent chips produced in academic settings with synthesis tools. It is contemplated that custom circuitry and layout will significantly reduce cycle time. Nevertheless, having a comparable clock cycle to RAW and Imagine suggests that future cross-comparisons will be interesting.

Conclusion

It has been shown through a combination of ASIC design synthesis and detailed performance simulation that a high performance WaveCache can be built in current generation technology. Three different implementations are feasible, including a modest (in both area and performance) version for portable applications; a 160 mm² chip for desktop computing, which gets respectable performance on single-threaded programs and 1.75 to 12× the performance of current CMPs and SMTs on coarse grain parallel applications; and a high-end workhorse for both coarse-grain and fine-grain applications (upwards of 120 IPC for the latter).

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for efficiently executing an application program on a dataflow computing device using one or more of its dataflow processing elements that can execute instructions comprising the application program without using a program counter because each dataflow processing element is autonomous and is thus capable of independently sequencing, issuing, and executing the instructions, comprising the steps of:
   (a) dividing a control flow graph of the application program into a plurality of waves, wherein each wave comprises a connected, directed partially ordered portion of the control flow graph, with a single entrance;
   (b) providing wave number tags to be used in identifying each individual dynamic instance of data used when executing the application program;
   (c) adding wave management instructions to the instructions comprising the application program to manage the wave number tags and the wave numbers associated with the waves, in accordance with a predefined instruction set architecture;
   (d) within each wave, annotating each memory operation with its location in the wave and in regard to its ordering relationship with other memory operations in the wave, to define a wave-ordered memory; and
   (e) executing the plurality of waves with said one or more dataflow processing elements, using the wave number tags, wave management instructions, and annotations of the memory operations to control the execution of the instructions comprising the application program, so that the execution of the instructions occurs in a desired order within each wave.

2. The method of claim 1, wherein within each wave, the step of annotating each memory operation comprises the step of statically assigning a unique sequence number within the wave to each memory operation.

3. The method of claim 2, wherein within each wave, the step of annotating each memory operation further comprises the step of labeling each memory operation with sequence numbers of its predecessor and successor memory operations, where possible, forming a link between the memory operation and its predecessor and successor memory operations, all such links thereby carrying out the step of encoding a structure of the control flow graph for the wave to enforce a correct order of the memory operations.

4. The method of claim 3, wherein to enforce the correct order of the memory operations, the method further comprises the steps of:
   (a) determining that a gap does not exist in a sequence of memory operations, if for each given memory operation:
      (i) a sequence number of its successor memory operation matches the sequence number of a next memory operation; or
      (ii) its successor memory operation is undetermined and the sequence number for a predecessor memory operation of a next memory operation matches the sequence number of the given memory operation; or
      (iii) its predecessor memory operation is undetermined and the sequence number for the successor memory operation of a previous memory operation matches the sequence number of the given memory operation;
   (b) adding a placeholder memory instruction to a path between a control flow branch and a merge that includes no memory operation; and
   (c) repeating step (a)(i) of this claim.

5. The method of claim 3, wherein the links encoding the structure of the control flow graph define sequencing information for executing the application program that provides a summary of possible paths taken while executing the application program.

6. The method of claim 5, wherein the sequencing information is used for at least one of:
   (a) defining the correct order of the memory operations;
   (b) detecting misspeculations in a speculative memory system associated with executing the application program; and
   (c) determining whether memory operations are aliased.

7. The method of claim 1, further comprising the step of disabling the wave-ordered memory to increase an extent of parallelism applied when executing the application program.

8. The method of claim 1, wherein if the application program includes a loop that requires carrying out one or more iterations, further comprising the step of employing wave advance instructions to compute a wave number for each iteration, wherein the wave number for each iteration is different than the wave number for any other iteration.

9. The method of claim 8, wherein the wave advance instructions enable management of wave numbers to be entirely distributed and under software control.

10. The method of claim 1, wherein the plurality of dataflow processing elements is grouped hierarchically into a plurality of domains.

11. The method of claim 1, wherein the plurality of dataflow processing elements is grouped into at least one of:
    (a) at least one domain; and
    (b) at least one cluster.

12. The method of claim 1, further comprising the step of storing the memory instructions at least temporarily in at least one of a memory cache and a store buffer.

13. The method of claim 1, further comprising the step of enabling communication between groups of dataflow processing elements over an interconnect bus.

14. The method of claim 1, further comprising the steps of:
    (a) detecting any defective dataflow processing element; and
    (b) routing instruction and data flow around a defective dataflow processing element.

15. The method of claim 1, further comprising the steps of:
    (a) matching operand tags at the dataflow processing element; and
    (b) holding operands for an instruction until all operands required for executing the instruction have been received by the dataflow processing element.

16. The method of claim 1, further comprising the step of speculatively outputting a result from a dataflow processing element before determining that an intended recipient instruction can accept the result.

17. A method for enabling multiple parallel memory operations to be supported by a dataflow processing system comprising a plurality of dataflow processing elements while maintaining a correct order in a sequence in which the memory operations are executed without using a program counter because each of said plurality of dataflow processing elements is autonomous and is thus capable of independently sequencing, issuing, and executing the instructions, comprising the steps of:
    (a) dividing a control flow graph for the sequence into portions called waves, wherein each wave comprises a connected, directed partially ordered portion of the control flow graph, with a single entrance;
    (b) providing wave number tags that identify each dynamic instance of data used when executing the application program;
    (c) based upon an instruction order in the sequence, annotating each memory operation with a sequence number indicating its position in a wave and its execution order relative to other memory operations in the wave; and
    (d) employing sequence numbers produced by annotating, and the wave number tags, to enforce a correct order for executing the memory operations on one or more of the dataflow processing elements.

18. The method of claim 17, wherein the step of annotating each memory operation comprises the steps of:
    (a) traversing the control flow graph in a defined order;
    (b) assigning consecutive sequence numbers to consecutive memory operations; and
    (c) labeling each memory operation with a sequence number of its predecessor memory operation and its successor memory operation, if each can be uniquely determined, and if not, labeling the memory operation with a wildcard value for any predecessor or successor memory operation that cannot be uniquely determined.

19. The method of claim 17, further comprising the step of using a store buffer to handle memory operation requests.

20. A method for efficiently controlling execution of instructions comprising an application program with a dataflow processing architecture that includes a plurality of dataflow processing elements employed for executing instructions without using a program counter because each of said plurality of dataflow processing elements is autonomous and is thus capable of independently sequencing, issuing, and executing instructions, comprising the steps of:
    (a) annotating each memory operation used in executing the application program;
    (b) assigning a wave number tag to each instance of data used when executing the application program, said wave number tag including a wave number that is assigned to a wave, wherein the wave comprises a connected, directed partially ordered portion of a control flow graph of the application program, with a single entrance; and
    (c) controlling a sequence in which the memory operations are executed, based upon annotations of the memory operations and the wave number, to ensure that the memory operations are executed in a correct order during execution of each wave, and thus, during execution of the application program.

21. The method of claim 20, wherein the step of annotating comprises the step of marking each memory operation with sequencing information that indicates, where possible, a sequence in which the memory operations are to be executed.

22. The method of claim 21, wherein the sequencing information is used for at least one of:
    (a) defining the correct order of the memory operations; and
    (b) detecting misspeculations in a speculative memory system associated with executing the application program.

23. The method of claim 21, wherein the annotations indicate, where possible, a predecessor memory operation and a successor memory operation, further comprising the step of including a wildcard in the annotation of a memory operation, for each predecessor and successor memory operation thereof that is not known.

24. The method of claim 20, further comprising the step of adding a placeholder memory instruction to a path between a control flow branch and a merge that includes no memory operation.

25. The method of claim 20, further comprising the step of ensuring that a gap does not exist in the sequence of the memory operations.

26. The method of claim 25, wherein the step of ensuring that a gap does not exist in the sequence of memory operations, comprises the step of determining for each memory operation, that:
   (a) a sequence number of its successor memory operation matches the sequence number of a next memory operation; or
   (b) its successor memory operation is undetermined and the sequence number for a predecessor memory operation of a next memory operation matches the sequence number of the memory operation; or
   (c) its predecessor memory operation is undetermined and the sequence number for the successor memory operation of a previous memory operation matches the sequence number of the memory operation.

27. The method of claim 20, further comprising the steps of:
   (a) dividing the control flow graph of the application program into a plurality of waves, each of which is associated with a wave number; and
   (b) adding wave management instructions to the instructions comprising the application program to manage the wave number tags and the wave numbers associated with the waves, in accordance with a predefined instruction set architecture.

28. The method of claim 27, wherein within each wave, the step of annotating comprises the step of annotating each memory operation with its location in the wave and in regard to its ordering relationship with other memory operations in the wave, to define a wave-ordered memory.

29. The method of claim 28, further comprising the step of executing the plurality of waves with the plurality of processing elements, using the wave number tags, wave management instructions, and annotations of the memory operations to control the execution of the instructions comprising the application program, so that the execution of the instructions occurs in a desired order within each wave.

30. The method of claim 20, further comprising the steps of:
   (a) matching operand tags at the processing element; and
   (b) holding operands for an instruction until all operands required for executing the instruction have been received by the processing element.

* * * * *